(12) United States Patent
Bolore et al.

(10) Patent No.: US 12,061,172 B2
(45) Date of Patent: Aug. 13, 2024

(54) PROCESS AND SYSTEM FOR INSPECTING OBJECT

(71) Applicant: SAINT-GOBAIN CERAMICS & PLASTICS, INC., Worcester, MA (US)

(72) Inventors: Damien Bolore, Brookline, MA (US); Betiglu Jimma, Buckhannon, WV (US); Mickael Boinet, Maubec (FR); Thibault Champion, Villelaure (FR); Brian Beauvais, Southborough, MA (US); Remi J. Goulet, Worcester, MA (US); Darren Rogers, Worcester, MA (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 18 days.

(21) Appl. No.: 17/663,343

(22) Filed: May 13, 2022

(65) Prior Publication Data
US 2022/0365032 A1 Nov. 17, 2022

Related U.S. Application Data

(60) Provisional application No. 63/188,363, filed on May 13, 2021.

(51) Int. Cl.
*G01N 29/06* (2006.01)
*G01N 29/04* (2006.01)

(52) U.S. Cl.
CPC ......... *G01N 29/069* (2013.01); *G01N 29/043* (2013.01); *G01N 2291/0232* (2013.01); *G01N 2291/105* (2013.01)

(58) Field of Classification Search
CPC .............. G01N 29/069; G01N 29/043; G01N 2291/0232; G01N 2291/105;
(Continued)

(56) References Cited

U.S. PATENT DOCUMENTS 4,519,245 A * 5/1985 Evans .................. G01N 29/045
73/579
7,543,513 B2 * 6/2009 Kobayashi .............. C04B 35/80
73/865.9
(Continued)

FOREIGN PATENT DOCUMENTS

| JP | 2004151078 A | 5/2004 |
|---|---|---|
| KR | 20130115678 A | 10/2013 |
| WO | 2020101930 A1 | 5/2020 |

OTHER PUBLICATIONS

Rucka et al., Ultrasound monitoring for evaluation of damage in reinforced concrete, Bulletin of the Polish Academy of Sciences, Technical Sciences, vol. 63, No. 1, 2015, 11 pages.
(Continued)

*Primary Examiner* — Tarun Sinha
(74) *Attorney, Agent, or Firm* — Abel Schillinger, LLP; Robert N Young

(57) ABSTRACT

A non-destructive process of inspecting an object can include positioning a first and second ultrasonic element relative to the body of the object and offsetting the first and second ultrasonic elements in a direction orthogonal to a longitudinal axis of the body. A further process of inspecting an object can include creating a map of the body of the object including at least one anomaly and providing a quality value associated with the body based on evaluation of one or more criteria selected from the group consisting of the type, number, size, shape, position, orientation, edge sharpness, and any combination thereof of the at least one anomaly. An ultrasonic system can include a first and second ultrasonic element and a processing element. The process element can be configured to create a map of the body including at least one anomaly and provide a quality value associated with the body based on evaluation of one or more criteria selected from the group consisting of the type,
(Continued)

number, size, shape, position, orientation, edge sharpness, and any combination thereof of the at least one anomaly.

20 Claims, 7 Drawing Sheets

(58) Field of Classification Search
CPC ......... G01N 29/4445; G01N 2291/011; G01N 2291/014; G01N 2291/015; G01N 2291/102; G01N 2291/048; G01N 2291/044; G01N 29/11; G01N 2291/0289; G01N 29/04; G01N 2291/2634; G01N 2291/02854; G01B 17/02; G01B 17/00; G01B 17/08; G01B 7/105
See application file for complete search history.

(56) References Cited

U.S. PATENT DOCUMENTS

| | | | |
|---|---|---|---|
| 7,757,558 B2 | 7/2010 | Bossi et al. | |
| 8,131,107 B2 | 3/2012 | Sun et al. | |
| 8,419,643 B2* | 4/2013 | Sarvazyan | A61B 8/0875 600/407 |
| 2007/0266790 A1 | 11/2007 | Gunasekaran et al. | |
| 2008/0060448 A1* | 3/2008 | Wiest | G01P 5/24 73/861.27 |
| 2015/0020594 A1* | 1/2015 | Tsubaki | G01N 29/11 73/629 |
| 2016/0202213 A1* | 7/2016 | Volker | G01N 29/043 73/598 |
| 2017/0365050 A1 | 12/2017 | Kurahashi et al. | |
| 2022/0003716 A1* | 1/2022 | Gunasekaran | G01N 29/043 |

OTHER PUBLICATIONS

Bouchaala et al., Carbonation assessment in concrete by nonlinear ultrasound, Cement and Concrete Research, Issue 41, published 2011, http://ees.elsevier.com/CEMCON/default.asp, 3 pages.

Kim et al., Drying shrinkage in concrete assessed by nonlinear ultrasound, Cement and Concrete Research, Issue 92, published 2017, http://ees.elsevier.com/locate/cemconres, 5 pages.

Payan et al., Applying nonlinear resonant ultrasound spectroscopy to improving thermal damage assessment in concrete, JASA Express Letters, published online Mar. 13, 2007, 7 pages.

Wright et al., Non-linear acoustics techniques for NDT, Theta Technologies Ltd., published Jan. 2013, http://www.researchgate.et/publication/277552238, 12 pages.

Meo et al., Detecting Damage in Composite Material Using Nonlinear Elastic Wave Spectroscopy Methods, Appl Compos Mater (2008) 15:115-126, published online Sep. 10, 2008, 12 pages.

Kazakov et al., Sensitive imaging of an elastic nonlinear wave-scattering source in a solid, Appl. Phys. Lett. 81, 646 (2002), https://doi.org/10.1063/1.1495081, published online Jul. 16, 2002, 4 pages.

Stoessel et al., Air-coupled ultrasound inspection of various materials, Ultrasonics 40 (2002) 159-163, www.elsevier.com/locate/ultras, 5 pages.

Fahr et al., Ultrasonic C-Scan Inspection of Composite Materials, Engineering Journal of Qatar University, vol. 5, 1992, p. 201-222, 17 pages.

Dr. Hillger, Flexus Concrete, Automated Ultrasonic Imaging System for Concrete Elements, published 2010, www.dr-hillger.de, 1 page.

Hillger et al., Air-coupled Ultrasonic Testing-Method, System and practical Applications, 11th European Conference on Non-Destructive Testing (ECNDT 2014), Oct. 6-10, 2014, Prague, Czech Republic, 9 pages.

Hillger et al., Practical Applications of Air-Coupled Ultrasonic Technique, 4th International Symposium on NDT in Aerospace 2012—Poster 11, 7 pages.

Ongpeng et al., Contact and Noncontact Ultrasonic Nondestructive Test in Reinforced Concrete Beam, Hindawi, Advances in Civil Engineering, vol. 2018, Artcile ID 5783175, https://doi.org/10.1155/2018/5783175, 11 pages.

Wronkowicz-Katunin et al., Ultrasonic C-Scan Image Processing Using Multilevel Thresholding for Damage Evaluation in Aircraft Vertical Stabilizer, International Journal of Image, Graphics and Signal Processing, Sep. 2015, 9 pages.

Broughton et al., Validation of Procedures for Ultrasonic C-Scan Inspection of PMCS: International Round-Robin, Technical Report—Jan. 2001, 25 pages.

Sadri et al., Non-Destructive Testing (NTD) and Monitoring of Refractory Lining in Operating Furnaces, Hatch, published 2017, 4 pages.

Allazadeh et al., Ultrasonic Image Analysis of Steel Slabs, Advanced Materials and Processes—Dec. 2008, 14 bages.

Training Guidelines in Non-destructive Testing Techniques, Manual for Ultrasonic Testing at Level 2, IAEA, Vienna, 2018, Training Course Series 67, 368 pages.

Manhart et al., Ultrasonic Imaging of Refractories Using Different Coupling Techniques, RHI Bulletin, 1, 2013, pp. 67-73, 7 pages.

International Search Report and Written Opinion for PCT/US2022/072313, mailed Aug. 31, 2022, 11 pages.

\* cited by examiner

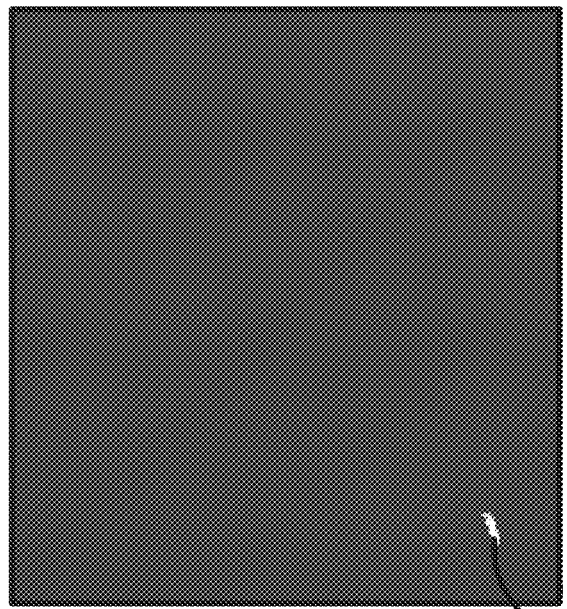
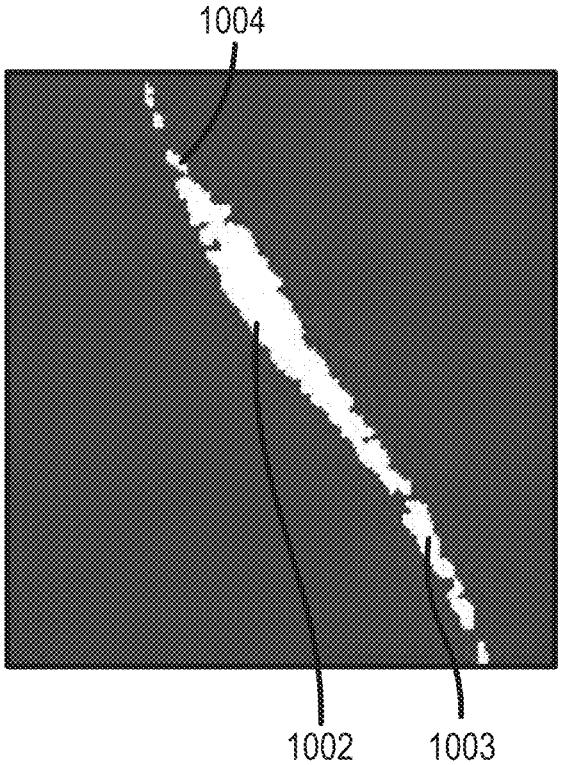
FIG. 10A  FIG. 10B
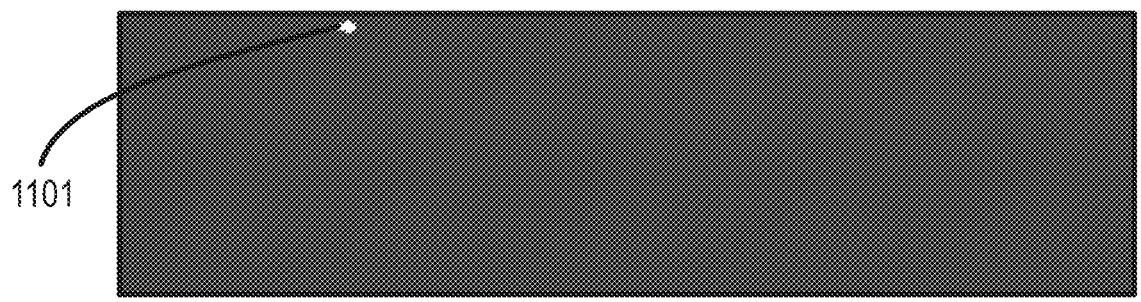
FIG. 11A
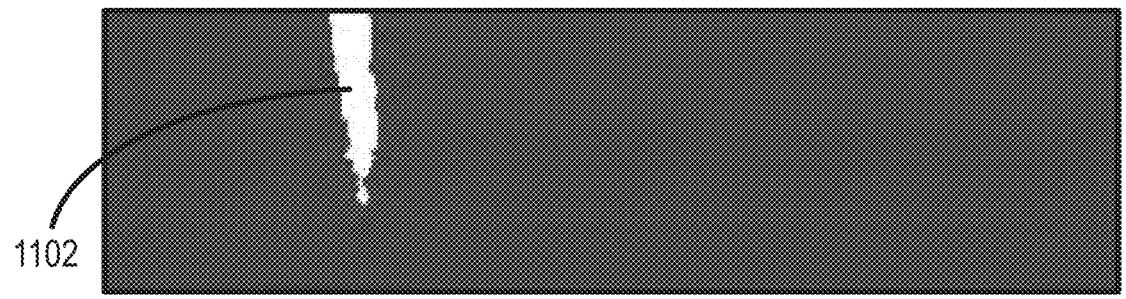
FIG. 11B

PROCESS AND SYSTEM FOR INSPECTING OBJECT

CROSS-REFERENCE TO RELATED APPLICATION(S)

This application claims priority under 35 U.S.C. § 119(e) to U.S. Provisional Application No. 63/188,363, entitled "PROCESS AND SYSTEM FOR INSPECTING OBJECT," by Damien BOLORE et al., filed May 13, 2021, which is assigned to the current assignee hereof and incorporated herein by reference in its entirety.

FIELD OF THE DISCLOSURE

The present disclosure is generally directed to a process and system for inspecting an object, and in particular, to a process and system utilizing ultrasound to inspect an object including a ceramic body.

BACKGROUND

Cracks can sometimes form inside large refractory blocks in the manufacturing process (e.g., pressing, handling, firing, or grinding). In the final applications, the presence of cracks may lead to the critical failure of the blocks, which can result in unacceptable downtime and associated costs. However, internal cracks may not always be identified in the inspection of the blocks.

SUMMARY

According to one aspect of the invention, a process of inspecting a ceramic body can include positioning a first and second ultrasonic element relative to the ceramic body, wherein the first and second ultrasonic elements are offset in a direction orthogonal to a longitudinal axis of the ceramic body and introducing ultrasonic signals into the ceramic body.

According to another aspect of the invention, a process of inspecting a ceramic body can include introducing ultrasonic signals into the ceramic body; receiving the ultrasonic signals leaving the ceramic body; creating a map of the ceramic body including at least one anomaly based on the received ultrasonic signals; and providing a quality value associated with the ceramic body based on evaluation of one or more criteria selected from the group consisting of the type, number, size, shape, position, orientation, edge sharpness, and any combination thereof of the at least one anomaly.

According to another aspect of the invention, an ultrasonic inspection system can include a first ultrasonic element configured to introduce ultrasonic signals into a body of an object; a second ultrasonic element configured to receive the ultrasonic signals leaving the body of the object; and a processing element configured to create a map of the body including at least one anomaly and provide a quality value associated with the body based on evaluation of one or more criteria selected from the group consisting of the type, number, size, shape, position, orientation, edge sharpness, and any combination thereof of the at least one anomaly.

BRIEF DESCRIPTION OF THE DRAWINGS

The present disclosure may be better understood, and its numerous features and advantages made apparent to those skilled in the art, by referencing the accompanying drawings. Embodiments are illustrated by way of example and are not limited in the accompanying figures.

FIGS. 10A, 11A, and 12A include maps including anomalies.

FIGS. 10B, 11B, and 12B include maps according to embodiments herein.

Skilled artisans appreciate that elements in the figures are illustrated for simplicity and clarity and have not necessarily been drawn to scale. For example, the dimensions of some of the elements in the figures may be exaggerated relative to other elements to help improve understanding of embodiments of the invention.

DESCRIPTION

Embodiments are directed to a process of inspecting an object in a non-destructive manner. The process can include performing an ultrasonic scan of the body of the object and analysis of the acquired data to identify an anomaly within the body. The ultrasonic scan may include a B-scan, a C-scan, or the like. In particular embodiments, the object can include a body including an anomaly including a defect, a non-defect anomaly, or a combination thereof. The process may further include categorizing an anomaly into a defect, such as a crack, or a non-defect anomaly, and providing a quality value corresponding to the quality of the body based on identification and/or analysis of the anomaly. In further embodiments, the process can include positioning ultrasonic elements (e.g., transmitter and receiver) in a particular manner to selectively magnify an anomaly including a defect.

Embodiments are directed to an ultrasonic inspection system. The system can include ultrasonic elements and a processing element. The system can be configured to perform the process of embodiments herein. For example, the processing element can be configured to categorize an identified anomaly and to provide a quality value associated with the body of the object. In particular, the system can be configured to run the process in an automated or semi-automated manner.

The process and system of embodiments herein may be suitable for inspecting objects having various shapes including, but not limited to, a block, a cube, a cylinder, a prism, or another shape. The object can include materials including, for example, ceramic, metal, plastic, composite, or the like. In particular embodiments, the object may include a ceramic body.

Figure 1:
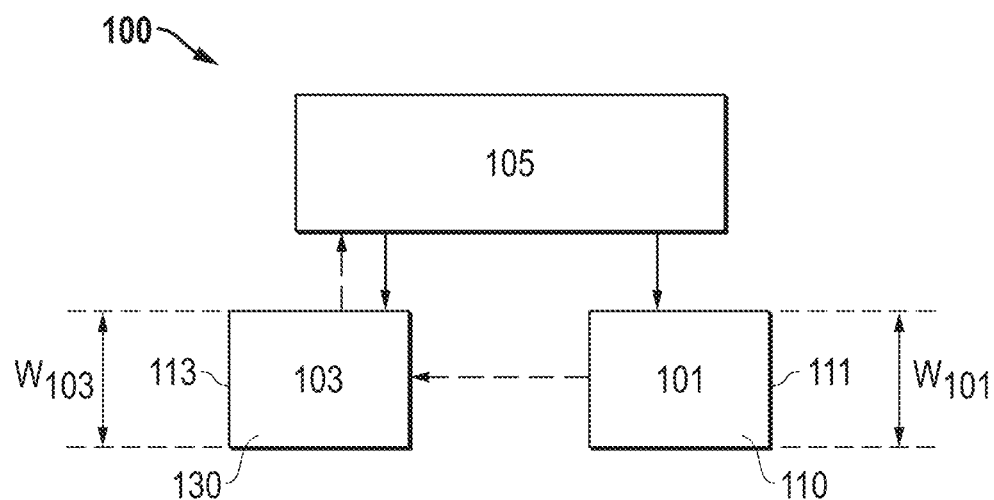
FIG. 1 includes an illustration of a portion of a system according to embodiments herein.

An exemplary ultrasonic inspection system 100 according to an embodiment is illustrated in FIG. 1, including a first ultrasonic element 101, a second ultrasonic element 103, and a processing element 105. The processing element 105 can include a computing device, a processor, an ASIC, an FPGA, or any combination thereof. The processing element 105 can be configured to apply an initial voltage and/or an electric current to the first and second ultrasonic elements 101 and 103. In some instances, the processing element 105 may be configured to position the first and second ultrasonic elements 101 and 103 relative to the object, direct movement of the first and second ultrasonic element, or both. The processing element 105 can also be configured to perform analysis of data acquired from the scan. For instance, the processing element 105 can be configured to plot data, acquire imaging data, identify and categorize an anomaly, provide a quality value associate with the object, or any combination thereof, based on signals received from the ultrasonic element (e.g., ultrasonic element 103 as illustrated in FIG. 1).

In an embodiment, the first and second ultrasonic elements 101 and 103 can include air-coupled transducers. The first and second ultrasonic elements 101 and 103 may be configured to be positioned spaced apart from the body of the object and to use air as a coupling medium. The first and second ultrasonic elements 101 and 103 may be configured to be positioned at different sides of the body of the object. In an exemplary application, the first ultrasonic element 101 may be a transmitter, and the second ultrasonic element 103 may be a receiver. The first ultrasonic element 101 may be configured to transmit an ultrasonic signal into the body of the object, and the ultrasonic signal may pass through the body and received by the second ultrasonic element 103. Further details of the ultrasonic system 100 will be discussed later in this disclosure.

Figure 3:
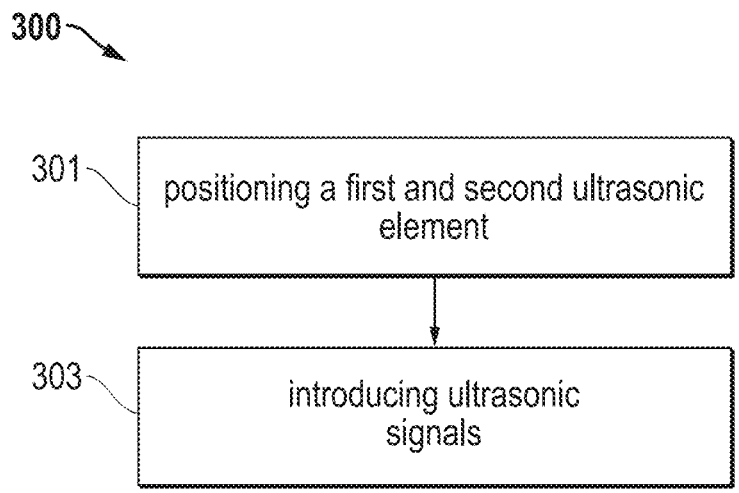
FIG. 3 includes a flowchart illustrating a process according to embodiments herein.

A portion of an exemplary process of inspecting an object, 300, is illustrated in FIG. 3 in accordance with embodiments. The process 300 can start at block 301 by positioning ultrasonic elements relative to the body of the object.

Figure 2:
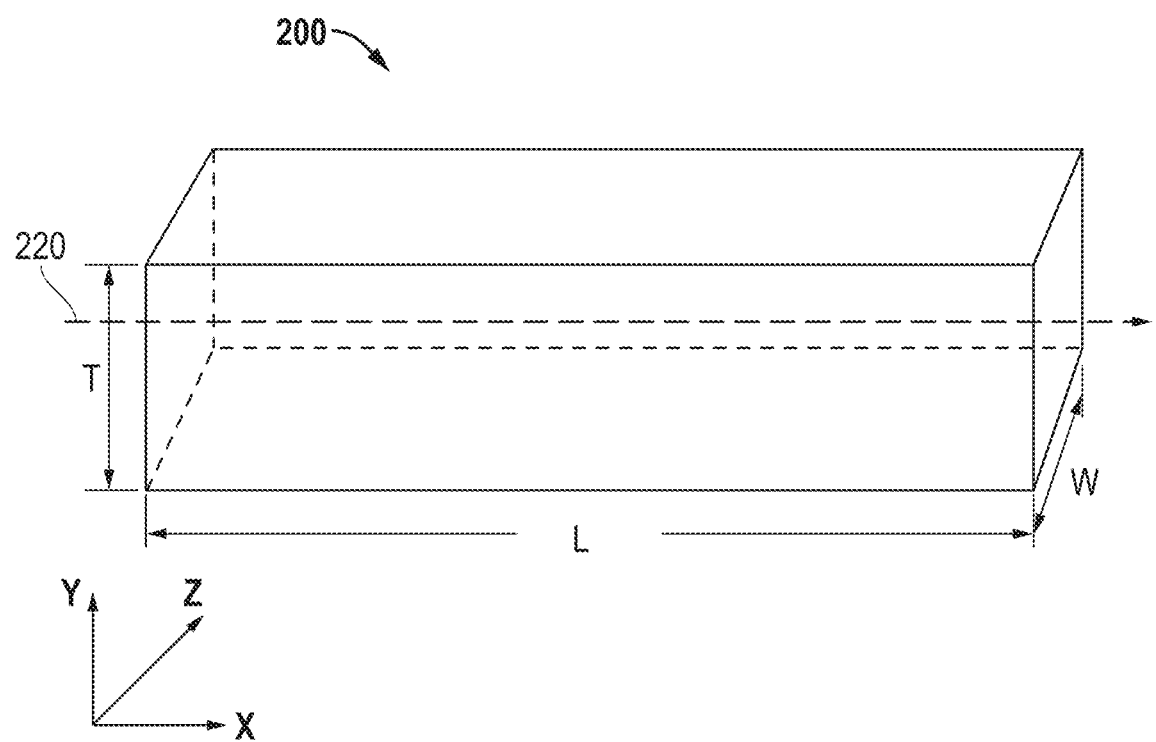
FIG. 2 includes an illustration of the body of an object according to embodiments herein.

Referring to FIG. 2, an exemplary object, a block, having a body 200 according to embodiments is illustrated. The body 200 includes a length L extending in the longitudinal axis 220 of the body 200, a width, and a thickness, T, wherein L≥W≥T. As illustrated, the body 200 has a cuboid shape. After reading this disclosure, a skilled artisan will appreciate the body of the object can have another shape. For example, in certain applications, the body can include a length, L, and a diameter, D, wherein L≥D.

As illustrated in FIG. 2, the block is placed on a surface such that the longitudinal axis 220 and the length, L extends in the direction of the X-axis, the thickness, T, extends in the direction of the Y-axis, and the width, W, extends in the direction of the Z-axis. A skilled artisan will appreciate the body of the object may be placed such that the longitudinal direction extends in a direction other than the X-axis to facilitate the scan of the body.

In an embodiment, positioning the first and second ultrasonic elements 101 and 103 can include positioning the first and second ultrasonic elements 101 and 103 at different sides of the body 200. For example, turning to FIGS. 4A and 4B, the first and second ultrasonic elements 101 and 103 are positioned at opposite sides across the body 200. In an example, the first and second ultrasonic elements may be placed toward longitudinal side surfaces of the body to perform the scan. As illustrated, the scan can be performed along the longitudinal side surfaces 251 and 252 defined by the length L and width W of the body 200. In another example, the first and second ultrasonic elements may be placed toward the end surfaces that may be defined by the thickness T and width W of the body 200 to perform the scan. In a further instance, the scan of the body 200 may include scanning the end surfaces, opposite longitudinal sides, or any combination thereof. In particular instances, the scan may be performed along the width and/or the thickness direction of the body 200 to minimize signal attenuation, to obtain improved signal intensity, or both.

Figure 4A:
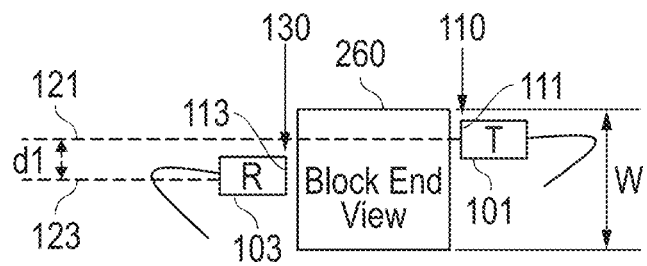
FIGS. 4A and 4B include illustrations of different views of an object and ultrasonic elements according to embodiments herein.
Figure 4B:
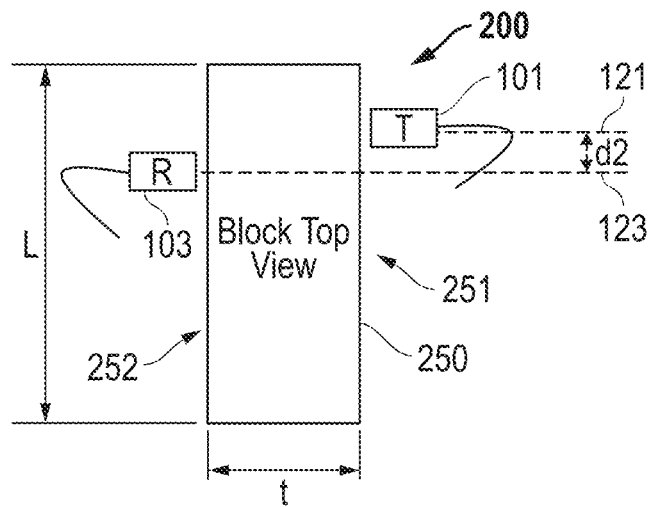

The first and second ultrasonic elements 101 and 103 may have a shape that has the side view and top view as illustrated in FIG. 4A and FIG. 4B, respectively, but it is to be appreciated the first and second ultrasonic elements can be in various shapes. For example, the first and second ultrasonic elements can have a side view, top view, or both having a shape other than a rectangle.

The first and second ultrasonic elements 101 and 103 can have a surface portion 110 and 130, respectively, facing the body 200. The surface portions 110 and 130 can have various shapes or sizes. For example, the surface portions 110 and 130 may be substantially circular, oval, rectangular, square, triangular, concave, or convex, or have another shape. The surface portions 110 and 130 may have substantially the same size, shape, or both. In certain instances, the surface portions 110 and 130 may have different shapes, sizes, or both.

In an embodiment, the surface portions 110 and 130 may include a particular dimension including a diameter, a width, a length, perimeter, a thickness, or any combination thereof that may facilitate the scan of the body. For example, the first and second ultrasonic elements 101 and 103 can include surface portions 110 and 130 having the sides 111 and 131 of a particular length, respectively. The sides 113 and 111 may be the width $W_{103}$ and $W_{101}$ of the surface portions 130 and 110, respectively (as illustrated in FIG. 1). In particular examples, the width $W_{103}$ and $W_{101}$ can be substantially the same.

In another embodiment, positioning the first and second ultrasonic elements 101 and 103 can include offsetting the first and second ultrasonic elements 101 and 103 in one or more directions. In an aspect, the first and second ultrasonic elements 101 and 103 can be offset in a direction orthogonal to the longitudinal axis 220 of the body 200. FIG. 4A includes an end view of the body 200 including an end surface 260 defined by the width W and thickness T of the body 200. The first and second ultrasonic elements 101 and 103 are positioned such that they are offset in the extending direction of the width, W, that is orthogonal to the longitudinal axis 220 as illustrated. It can be appreciated that the offset may be in the thickness direction when the object is placed on one of the longitudinal side surfaces 251 or 252. In particular, as illustrated, the object 200 is seated on a longitudinal side of the body, the offset of the first and second ultrasonic elements 101 and 103 can include an offset in the vertical direction.

In reference to FIG. 2, in a particular implementation, the scan may be performed at longitudinal side surfaces defined by the length L and thickness T, for which the first and second ultrasonic elements can be separated by the body in the direction of the Z-axis, and the offset can be in the direction including the Y-axis, the X-axis, or both for. In another particular implementation, the offset can be in the direction including the Z-axis, the X-axis, or both for the scan performed at longitudinal side surfaces defined by the length L and width W, for which the first and second ultrasonic elements can be separated by the body 200 in the direction of the Y-axis. In a further particular implementation, the offset can be in the direction including the Y-axis, the Z-axis, or both for the scan performed at end surfaces defined by the thickness T and width W, for which the first and second ultrasonic elements may be separated by the body in the direction of X-axis.

Offsetting the first and second ultrasonic elements 101 and 103 in the direction orthogonal to the longitudinal axis 220 may force ultrasonic signals to travel in a diagonal path instead of a straight path inside the body 200 so that the ultrasonic signals may pass multiple times through an anomaly, which may facilitate with magnifying and plotting the anomaly.

In a further aspect, the first and second ultrasonic elements 101 and 103 can be positioned such that they are offset in the direction of the longitudinal axis 220. FIG. 4B includes an illustration of the top views of the body 200 and the first and second ultrasonic elements 101 and 103. The body 200 can include a top surface 250 and a bottom surface (not illustrated) each defined by the thickness, T, and length L of the body 200. It can be appreciated that in the illustrated example, the top surface 250 and the bottom surface are longitudinal sides of the body 200. The ultrasonic elements 101 and 103 may be positioned such that the surface portions 110 and 130 may be substantially parallel to the longitudinal side surfaces 251 and 252, respectively. The first and second ultrasonic elements 101 and 103 are offset in the extending direction of the length L, that is the longitudinal axis 220. In a further aspect, the first and second ultrasonic elements 101 and 103 can be positioned such that the elements are offset in the direction orthogonal to the longitudinal axis 220 and in the direction of the longitudinal axis 220. In a further aspect, the first and second ultrasonic elements 101 and 103 can be offset in at least two directions of x-axis, y-axis, and z-axis.

In an embodiment, offsetting the ultrasonic elements 101 and 103 may include partially overlapping the ultrasonic elements 101 and 103 in one or more directions. In an example, the ultrasonic elements 101 and 103 may partially overlap in a direction orthogonal to the longitudinal-axis. In another example, the ultrasonic elements 101 and 103 may partially overlap in the direction of the longitudinal axis. In another embodiment, the ultrasonic elements 101 and 103 may not overlap in at least one direction, at least two directions, or all directions.

In a further embodiment, the first and second ultrasonic elements 101 and 103 can be offset by a particular distance d that may facilitate improved scan and inspection of the objection. The distance d may be measured between the centers of the surface portions 110 and 130 in the offsetting direction, as illustrated in FIGS. 4A and 4B. The first and second surface portions 110 and 130 may include a central axis 121 and 123, respectively. As illustrated, the central axis 121 and 123 may be substantially parallel. The ultrasonic elements 101 and 103 can be offset by the distance between the central axes 121 and 123. In particular, the first and second ultrasonic elements 101 and 103 can be offset by the distance d2 in the longitudinal direction of the body and by the distance d1 in the width direction. In an embodiment, the distance d1 may be substantially the same as d2. In another embodiment, the distance d1 may be different from d2. In an example, d1 may be greater than d2. In another example, d2 may be greater than d1. In a further embodiment, the first and second ultrasonic elements 101 and 103 may be offset and partially overlap in one or more directions.

Figure 13:
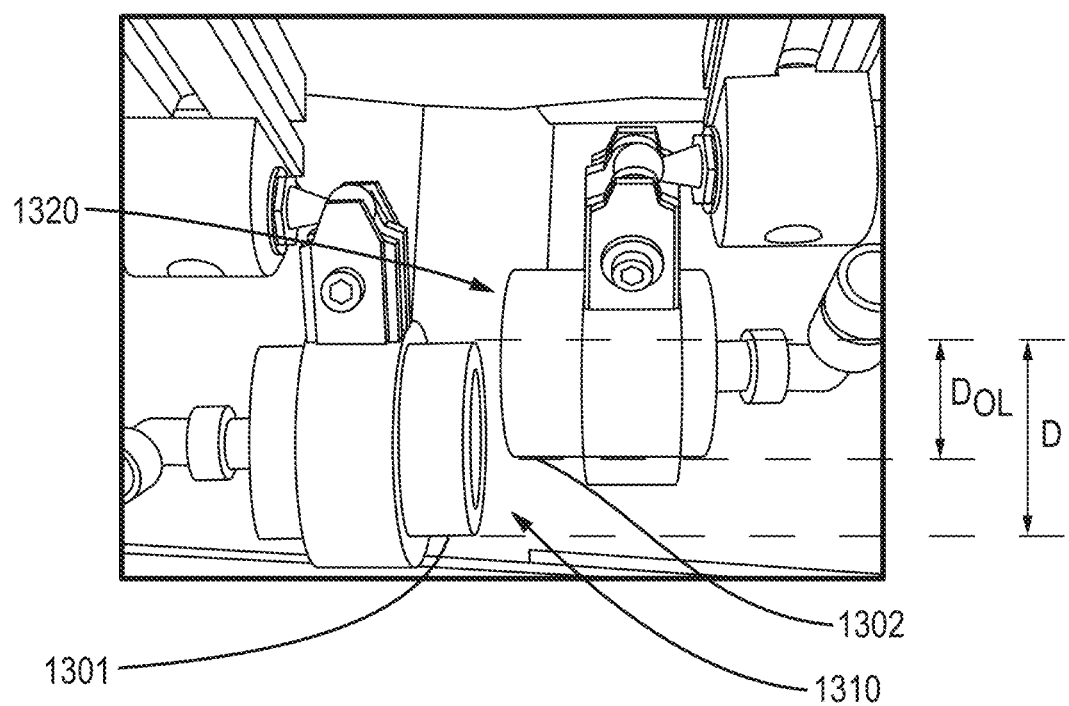
FIG. 13 includes an illustration of ultrasonic elements according to an embodiment.

Referring to FIG. 13, the ultrasonic elements 1301 and 1302 are illustrated. The ultrasonic elements 1301 and 1302 are partially overlapped and include the surface portions 1310 and 1320 respectively.

In another embodiment, the first and second ultrasonic elements 1301 and 1302 may have a particular overlap that can facilitate improved scan and inspection of the object. In an aspect, the overlap, $D_{OL}$, may be less than 50% of the outer diameter D of the surface portion 1310 or 1320, such as less than 45%, less than 40%, at most 37%, at most 35%, at most 33%, at most 30%, at most 25%, at most 20%, at most 15%, at most 10%, or at most 5% of the outer diameter of the surface portion 1310 or 1320. In particular instances, the first and second ultrasonic elements 1301 and 1302 may not overlap. In another instance, the overlap of the first and second ultrasonic elements 1301 and 1302 may be at least 0.5% of the outer diameter D of the surface portion 1310 or 1320, such as at least 1%, at least 2%, at least 4%, at least 5%, at least 7%, or at least 10% of the dimension of the surface portions. Moreover, it can be appreciated, the overlap of the first and second ultrasonic elements 1301 and 1302 may be in a range including any of the minimum and maximum percentages noted herein. In instances that the outer diameter D of the first and second ultrasonic elements 1301 and 1302 are different, the overlap may be related to the smaller outer diameter of the two. It can be appreciated that the overlap may be related to a minor dimension when the ultrasonic elements include a non-circular surface portion and that any or all of the percentages noted herein with respect to ultrasonic elements 1301 and 1302 can be applied. It can be further appreciated the overlap described in embodiments herein may be in one or more directions.

In an embodiment, the first and second ultrasonic elements 101 and 103 can be offset in the direction orthogonal to the longitudinal axis 220 by a particular distance d that can facilitate improved scan and inspection of the object. In an aspect, the first and second ultrasonic elements 101 and 103 can be offset in the direction orthogonal to the longitudinal axis 220 by at least 20 mm, such as at least 25 mm, at least 28 mm, or even greater than 28 mm. In a further aspect, offsetting the first and second ultrasonic element with relatively large offset may facilitate improved detectability of certain anomalies and facilitates characterization of anomalies. For example, be offset in the direction orthogonal to the longitudinal axis 220 can be at least 30 mm, at least 33 mm, at least 35 mm, at least 38 mm, at least 40 mm, at least 42 mm, at least 47 mm, or at least 50 mm. In another aspect, offsetting the first and second ultrasonic elements may be performed in a carefully controlled manner such that the offset may not cause signal attenuation. In an example, the first and second elements 101 and 103 can be offset in the direction orthogonal to the longitudinal axis by at most 200 mm, at most 190 mm, at most 180 mm, at most 160 mm, or at most 150 mm. In particular implementations, the offset may be at most 120 mm, at most 100 mm, at most 80 mm, at most 55 mm, at most 48 mm, at most 45 mm, at most 41 mm, at most 38 mm, or at most 35 mm. In a further aspect, the first and second ultrasonic elements may be offset by the distance d in a range including any of the minimum and maximum values noted herein.

Briefly turning to FIGS. 4A and 4B, the first and second electronic elements 101 and 103 may be offset in the longitudinal axis and in the direction of the width, which is orthogonal to the longitudinal axis. In an exemplary implementation, C-scan may be performed. For example, scanning of the body of the object 200 may include moving the first and second electronic elements 101 and 103 along the longitudinal axis from one end, such as the end 260, to the opposite end at a first elevation, moving the first and second electronic elements up or down in the width direction to a second elevation, and moving the first and second electronic elements along the longitudinal axis back to the end 260. Scanning can continue by moving the first and second ultrasonic elements to different elevations and between the end 260 and the opposite the end until the entire longitudinal side surfaces 252 and 251 are scanned. The first elevation may be the top, the bottom, or any position in between of the body of the object 200, and the second elevation may be above or below the first elevation.

In another aspect, the first and second ultrasonic elements can be offset by at least 30% of a dimension of the surface portions 110 or 130 in the direction orthogonal to the longitudinal axis 220 of the body 200, such as at least 40%, at least 50%, at least 60%, at least 70%, at least 80%, or at least 90% of the dimension of the surface 110 or 130. In particular aspects, the dimension can include the length, width, or diameter of the surface portion 110 or 130. When the dimensions are different between the surface portions 110 and 130, the distance d may be relative to the smaller dimension. In another aspect, the first and second ultrasonic elements 101 and 103 may be offset by at most 5 times a dimension of the surface portion 110 or 130, at most 4 times, at most 3 times, at most 2 times, at most 1.5 times, at most 1.2 times, at most 1 times, or at most 0.9 times the dimension of the surface portion 110 or 130. In a further aspect, the first and second ultrasonic elements may be offset by the distance d in a range including any of the minimum and maximum values noted herein. It can be appreciated the dimension may be the width of the surface portion 110 or 130, as illustrated in FIGS. 4A and 4B. In another example, the dimension may be the out diameter when the surface portion 110 and 130 are circular, similar to first and second ultrasonic elements 1301 and 1302 illustrated in FIG. 13.

In an embodiment, the first and second ultrasonic elements 101 and 103 can be offset in the extending direction of the width W by a particular distance d that can facilitate improved scan and inspection of the object. The extending direction of the width W can be orthogonal to the longitudinal axis of the object (illustrated in FIGS. 4A and 4B). In particular examples, when the object is placed on a longitudinal side, the width may be extending in the vertical direction relative to the longitudinal axis of the object. In an embodiment, the first and second ultrasonic elements 101 and 103 can be offset in in the extending direction of the width W by greater than 25 mm, such as greater than 28 mm, at least 30 mm, at least 33 mm, at least 35 mm, at least 38 mm, at least 40 mm, at least 42 mm, at least 45 mm, at least 47 mm, or at least 50 mm. In another aspect, the first and second elements 101 and 103 can be offset in the extending direction of the width W by at most 200 mm, at most 190 mm, at most 180 mm, at most 160 mm, at most 150 mm, or at most 120 mm. In particular examples, the offset may be at most 100 mm, at most 90 mm, at most 75 mm, at most 70 mm, at most 65 mm, at most 60 mm, at most 50 mm, at most 45 mm, at most 40 mm, or at most 35 mm. In a further aspect, the first and second ultrasonic elements may be offset by the distance d in the extending direction of the width W in a range including any of the minimum and maximum values noted herein.

It is to be appreciated the particular values described with respect to the distance of the offset or overlap herein are in reference to the absolute value. It can be appreciated to have a particular offset or overlap, the first and second ultrasonic elements may be moved relative to each other. The distance or overlap created by moving the first and/or second ultrasonic element away from one another may be given a positive value. The distance or overlap created by moving the first and/or second ultrasonic element to cross one another may be given a negative value. It can be further appreciated an absolute value noted in embodiments herein, e.g., an offset distance of at least 33 mm, may include the offset distance equal or greater than the positive value, e.g., equal or greater than 33 mm, and including equal or less than the negative value, e.g., equal or less than −33 mm.

In a particular embodiment, the first and second ultrasonic elements 101 and 103 may be offset by a distance greater than 25 mm in the direction of the longitudinal axis and in a direction orthogonal to the longitudinal axis.

In another embodiment, the first and second ultrasonic elements 101 and 103 can be offset in the extending direction of the width W by a particular distance d that can facilitate improved scan and inspection of the object. In an aspect, the first and second ultrasonic elements 101 and 103 can be offset in the extending direction of the width W by at least 2%, at least 5% of the width W of the body, such as at least 10%, at least 20%, at least 35%, at least 50%, at least 70%, or at least 90% of the width of the ceramic body. In another aspect, the first and second ultrasonic elements 101 and 103 can be offset in the extending direction of the width W by at most 50% of the width W of the body, such as at most 45%, at most 40%, at most 30%, at most 20%, at most 15%, at most 10%, or at most 5% of the width W of the body. In a further aspect, the first and second ultrasonic elements may be offset by the distance d in a range including any of the minimum and maximum values noted herein.

In an embodiment, the first and second ultrasonic elements 101 and 103 can be offset in the direction of the longitudinal axis 220 (illustrated in FIG. 2) by a particular distance d that can facilitate improved scan and inspection of the object. In an embodiment, the first and second ultrasonic elements 101 and 103 can be offset in the direction of the longitudinal axis 220 by greater than 20 mm, such as greater than 28 mm, at least 30 mm, at least 33 mm, at least 35 mm, at least 38 mm, at least 40 mm, at least 42 mm, at least 45 mm, at least 47 mm, or at least 50 mm. In another aspect, the first and second elements 101 and 103 can be offset in the direction orthogonal to the longitudinal axis by at most 200 mm, at most 190 mm, at most 180 mm, at most 160 mm, at most 150 mm, at most 120 mm, at most 90 mm, at most 75 mm, at most 70 mm, at most 65 mm, at most 60 mm, at most 50 mm, at most 45 mm, at most 40 mm, or at most 35 mm. In a further aspect, the first and second ultrasonic elements may be offset by the distance d in the direction of the longitudinal axis 220 in a range including any of the minimum and maximum values noted herein.

In another embodiment, the first and second ultrasonic elements 101 and 103 can be offset in the extending direction of the length L by a particular distance d that can facilitate improved scan and inspection of the object. In an aspect, the first and second ultrasonic elements can be offset in a direction of the longitudinal axis by at least 0.5% of the length L, such as at least 0.7%, at least 1%, at least 2%, at least 5%, at least 8%, at least 10%, at least 20%, at least 30%, at least 50%, at least 70%, or at least 90% of the length L of the body. In another aspect, the first and second ultrasonic elements can be offset in the direction of the longitudinal axis of the body by at most 90% of the length L of the ceramic body, at most 80%, at most 70%, at most 60%, at most 50%, at most 40%, at most 30%, at most 20%, at most 10%, at most 7%, at most 5%, at most 3%, or at most 2% of the length L. In a further aspect, the first and second ultrasonic elements may be offset by the distance d in a range including any of the minimum and maximum values noted herein.

In another embodiment, the first and second ultrasonic elements 101 and 103 can be offset in the extending direction of the thickness T by a particular distance d that can facilitate improved scan and inspection of the object. In an aspect, the first and second elements 101 and 103 can be offset in the extending direction of the thickness T of the body by at least 1% of the thickness T of the body, such as at least 2%, at least 5%, at least 8%, at least 10%, at least 13%, at least 17%, at least 20%, at least 23%, at least 28%, at least 30%, at least 40%, at least 50%, at least 70%, or at least 90% of the thickness T of the body. In another aspect, the first and second elements can be offset in the extending direction of the thickness T of the body by at most 90% of the thickness T of the body, such as at most 80%, at most 70%, at most 60%, at most 50%, at most 40%, at most 30%, at most 20%, at most 10%, or at most 5% of the thickness T of the body. In a further aspect, the first and second ultrasonic elements may be offset by the distance d in a range including any of the minimum and maximum values noted herein.

In another embodiment, the first and second ultrasonic elements 101 and 103 can be offset in the extending direction of the thickness T by a particular distance d that can facilitate improved scan and inspection of the object. The extending direction of the thickness T can be orthogonal to the longitudinal axis of the object (illustrated in FIGS. 4A and 4B). In particular examples, when the object is placed on a longitudinal side, the thickness may be extending in the vertical direction relative to the longitudinal axis of the object. In an embodiment, the first and second ultrasonic elements 101 and 103 can be offset in in the extending direction of the thickness T by greater than 25 mm, such as greater than 28 mm, at least 30 mm, at least 33 mm, at least 35 mm, at least 38 mm, at least 40 mm, at least 42 mm, at least 45 mm, at least 47 mm, or at least 50 mm. In another aspect, the first and second elements 101 and 103 can be offset in the extending direction of the thickness T by at most 200 mm, at most 190 mm, at most 180 mm, at most 160 mm, at most 150 mm, at most 120 mm, at most 90 mm, at most 75 mm, at most 70 mm, at most 65 mm, at most 60 mm, at most 50 mm, at most 45 mm, at most 40 mm, or at most 35 mm. In a further aspect, the first and second ultrasonic elements may be offset by the distance d in the extending direction of the thickness T in a range including any of the minimum and maximum values noted herein.

In a further embodiment, the processing element 105 can be configured to offset the first and second ultrasonic elements 101 and 103 in a manner described in embodiments herein. In another embodiment, offsetting the first and second ultrasonic elements 101 and 103 may be performed manually.

The process 300 can continue to block 303, introducing ultrasonic signals into the body 200 to perform the scan of the body 200. An initial voltage may be applied to the first and second ultrasonic elements 101 and 103 to generate ultrasonic signals (i.e., ultrasound waves). In an embodiment, the processing element 105 may be configured to apply the initial voltage to the ultrasonic elements for one of the ultrasonic elements (e.g., element 101 as illustrated in FIG. 1) to transmit ultrasonic signals and the other (e.g., element 103 as illustrated in FIG. 1) to receive ultrasonic signals that pass through the body 200. In an embodiment, the initial voltage can be at least 100V, at least 200V, at least 300V, or at least 400V. In another embodiment, the initial voltage is at most 800V, at most 700V, at most 600V, at most 500V, or at most 400V. Moreover, the initial voltage can be in a range including any of the minimum and maximum values noted herein.

In an embodiment, the process 100 can include introducing low-frequency ultrasonic signals into the body. For example, the first and second ultrasonic elements 101 and 103 can be configured to transmit and receive low-frequency ultrasonic signals, respectively. In an aspect, the ultrasonic signals introduced into the body 200 can have a frequency of at most 500 kHz, at most 400 kHz, at most 350 kHz, at most 300 kHz, at most 275 kHz, at most 250 kHz, at most 220 kHz, or at most 200 kHz. In another aspect, the ultrasonic signals introduced into the body 200 can have a frequency of at least 5 kHz, at least 10 kHz, at least 50 kHz, at least 100 kHz, at least 150 kHz, at least 175 kHz, or at least 200 kHz. Moreover, the ultrasonic signals introduced into the body 200 can have a frequency in a range including any of the minimum and maximum values noted herein. In a further example, the frequency can be in a range from 5 kHz to 500 kHz or in a range from 50 kHz to 300 kHz or in a range from 100 kHz to 275 kHz.

In an embodiment, introducing ultrasonic signals into the body may include scanning along the longitudinal axis 220 of the body 200, the extending direction of the width W, the extending direction of the thickness T, or any combination thereof. In another embodiment, the ultrasonic signals may be introduced into the body through a side surface, an end surface, or both. In a particular embodiment, the ultrasonic signals can be introduced into the body 200 in a direction perpendicular to the side surface or end surface through which the ultrasonic signals enter the body 200.

In a further embodiment, the process 100 may include computing a histogram based on received ultrasonic signals. The ultrasonic element 103 can be configured to receive ultrasonic signals that pass through the body 200 and to send corresponding signals to the processing element 105. The processing element 105 may be configured to compute a histogram based on ultrasonic signals received from the body 200. The histogram may include data including frequency, velocity, amplitude, attenuation, time-of-flight, or any combination thereof.

In an embodiment, the process 100 may include comparing the histogram to a stored reference histogram to determine whether the scan of the body 200 is acceptable. The reference histogram can be based on data acquired from a previous good scan of a body similar to the body 200. Alternatively, or additionally, the process 100 can include studying characteristics of the histogram including the position of the peak, the width of the peak, level of saturation of the histogram, or any combination thereof. For example, a peak position and/or width corresponding to up to 70% transmission may suggest an acceptable scan of the body 200 is performed.

In instances, the process 100 may be repeated until an acceptable scan of the body 200 is performed. One or more acquisition parameters used previously may be adjusted to improve the scan. In an example, the acquisition parameters can include offset of the first and second ultrasonic elements 101 and 103, initial voltage, gain and window parameters, and any combination thereof.

In an embodiment, a batch of objects may be inspected using the process 100 as described in embodiments herein. Previously stored acquisition parameters may be used for inspecting similar objects. Alternatively, one or more of the objects may be inspected to set acquisition parameters for an acceptable scan, which can be used for inspecting the rest of the batch. A skilled artisan will appreciate that adjustments may be made to one or more acquisition parameters as needed to ensure an acceptable scan of each object.

Figure 5:
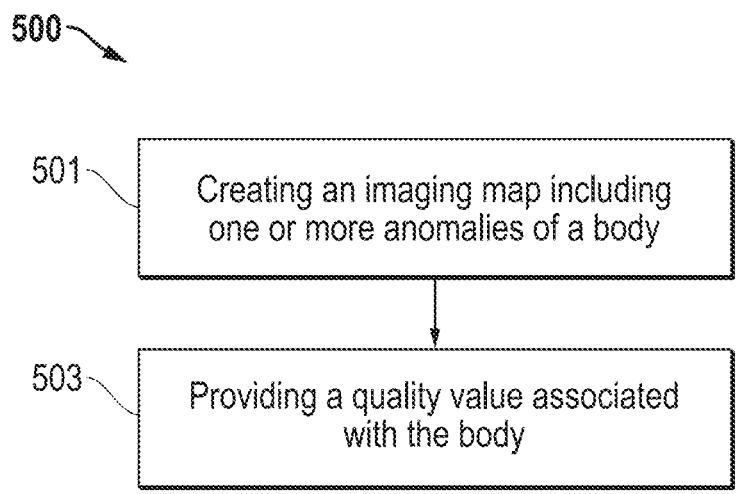
FIG. 5 includes a flowchart illustrating a process according to embodiments herein.

FIG. 5 includes a flow chart illustrating an exemplary process 500 according to embodiments herein. The process can be performed separately, such as on previously acquired data or following the process 300. In a particular embodiment, the processing element 105 can be configured to perform the process 500.

The process 500 can start at block 501, creating a map of the body based on the ultrasonic signals received from the body 200. In an embodiment, creating a map of the body 200 can include acquiring imaging data based on received ultrasonic signals. The processing element 105 can be configured to acquire data related to characteristics of the ultrasonic signals including, for example, amplitude, frequency, time, velocity, or any combination thereof, to generate a map of the body 200.

In an aspect, the body 200 may include one or more anomalies. As the ultrasonic signals pass through one or more anomalies, characteristics of the ultrasonic signals may change. In another aspect, the map can include one or more anomalies corresponding to the one or more anomaly in the body 200. In a further aspect, the map may be a two-color map or have more than two colors. In a further aspect, the map can include an amplitude map, a time-of-flight map, or a combination thereof. In still another aspect, the map may include a plan view image of a cross-section of the body. In a particular aspect, the map may include a plan view image representative of an entire thickness of the body. In still another aspect, the map may include a 3-dimensional image of the body.

Figure 6:
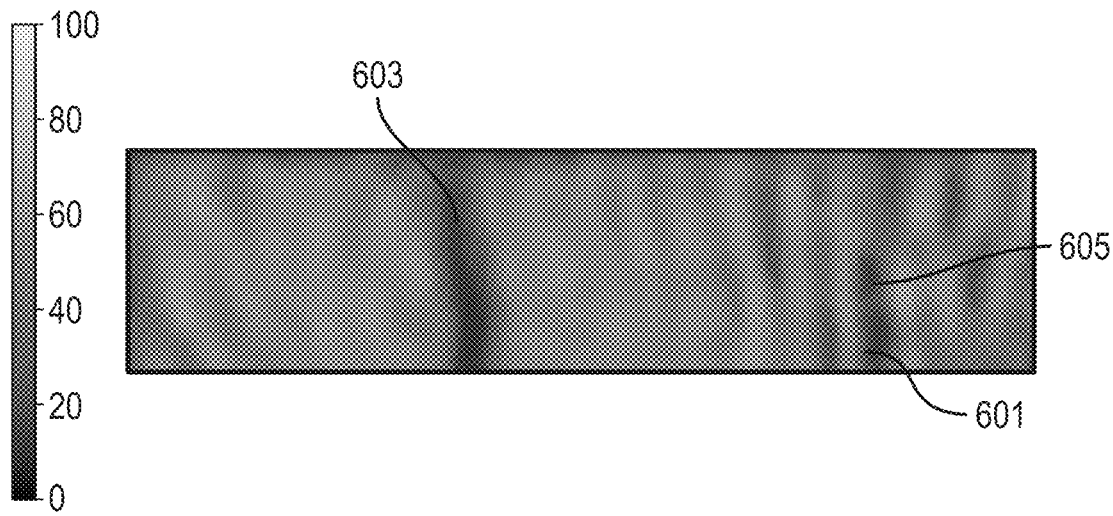
FIG. 6 includes an exemplary map of a body according to an embodiment.

In an embodiment, the process 500 can include identifying one or more anomaly in the map of the body 200. In a particular aspect, the one or more anomaly can include a plurality of attenuated pixels. FIG. 6 includes an exemplary imaging map of the body of an object similar to the body 200. The map includes attenuated regions including a first region 601, a second region 603, and a third region 605.

In a particular embodiment, the process 500 can include applying a first threshold to the map of the body 200 to facilitate identification of one or more anomaly. In an aspect, the first threshold can be predetermined based on stored ultrasonic inspection data of at least 30 scans of similar bodies, such as at least 40, at least 50, at least 80, at least 100, or at least 200 scans of similar bodies. In a further aspect, the first threshold can include an amplitude threshold. In a particular aspect, the first threshold may be at least 15%, at least 18%, or at least 20% of transmitted ultrasonic signals. In another aspect, the first threshold may be at most 35%, at most 30%, at most 25%, or at most 20% of transmitted ultrasonic signals. In a further aspect, the first threshold may be in a range including any of the minimum and maximum values noted herein.

In another aspect, the first threshold may be set by testing on a first group of objects that are known to have no defect and a second group of similar objects but known to have defects (e.g., cracks). Maps can be generated based on imaging data acquired from the first and second groups as described in embodiments herein. Different thresholds can be applied to the maps to find the threshold that may allow minimum error rates of both false positive and false negative objects. The threshold can be used as the first predetermined threshold and stored for inspecting similar objects in the future.

Figure 7:
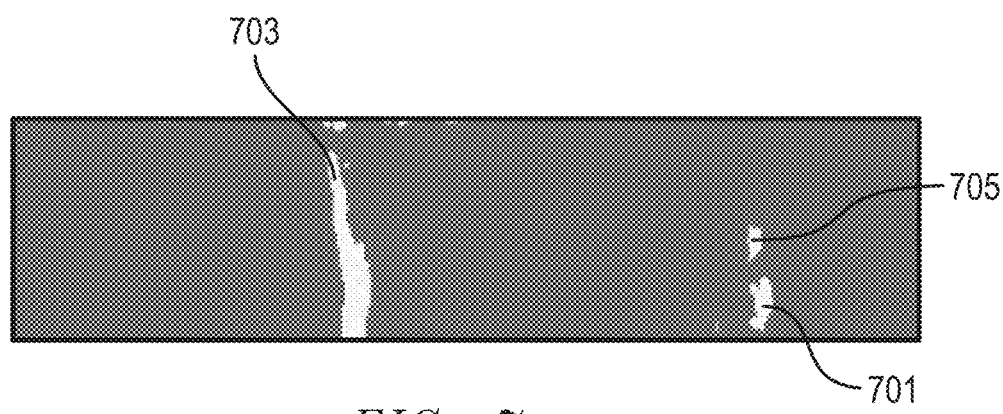
FIG. 7 includes an exemplary map of a body according to another embodiment.

FIG. 7 includes an exemplary two-color image map of a body similar to the body 200 including a first anomaly 701, a second anomaly 703, and a third anomaly 705, after the predetermined threshold is applied.

In an embodiment, the process 500 can further include analyzing and categorizing the identified one or more anomaly, which may facilitate improved inspection of the object. In an aspect, the process 500 may further include image denoising, such as Gaussian denoising, median filtering, total variation denoising, the like, or any combination thereof, to provide a clearer image to facilitate analysis of the one or more anomaly. In at least one aspect, categorizing the one or more anomaly can be based on analysis including evaluation of the size, shape, edge sharpness, or any combination thereof, of the one or more anomaly. In a further aspect, the processing element 105 can be configured to perform analysis of and categorize the one or more anomaly.

In an aspect, analyzing can include evaluating a size of the identified anomaly. In particular instances, an anomaly including a defect may have a surface area that is different than a surface area of a non-defect anomaly. In an exemplary application, each surface area of the one or more anomaly may be determined and the percentage of the surface area against the total surface area of the one or more anomaly may be used to compare to a reference percentage. In an example, the reference percentage may be predetermined based on historical data including surface area percentages of anomalies corresponding to a defect (e.g., cracks) and non-defect anomalies, and help distinguish a defect anomaly from a non-defect anomaly. Alternatively, the reference percentage may be determined by evaluating the sizes of a group of objects known to have no defect and another group of similar objects known to have defects. The percentage that allows minimum false positive and false negative error rates may be used as the reference percentage and also be stored for inspecting similar objects in the future.

In a particular aspect, the one or more anomaly may include an anomaly including a defect, such as a crack, a non-defect anomaly, or any combination thereof. An exemplary non-defect anomaly may include a fluctuation in the body 200 that can cause a change to one or more characteristics of ultrasonic signals. In particular instances, a non-defect anomaly may cause signal attenuation or scattering that can result in a reduced transmission on a scan of the body. An exemplary non-defect anomaly may include a porosity fluctuation, a density fluctuation, a microstructural change (i.e., due to a certain content ratio of coarse to fine grains), chemical pollution, or any combination thereof. It can be more difficult to distinguish a certain non-defect anomaly, such as density fluctuation, than another non-defect anomaly, such as porosity, from a defect anomaly including a crack. To aid illustration of inspection processes and systems of embodiments herein, exemplary images and examples of representative refractory blocks include intentionally introduced anomalies of density fluctuation as density fluctuation appears incidentally.

In an embodiment, the process 500 can include categorizing the one or more anomaly into a type of anomaly including a first type of anomaly or a second type of anomaly. The first type of anomaly can correspond to a defect, and the second type of anomaly can correspond to a non-defect anomaly. In a particular aspect, categorization can be based on evaluation of the size of the one or more anomalies. For example, an anomaly may be categorized into the first type of anomaly when the surface area percentage of the anomaly is at least or greater than the reference percentage. In another example, an anomaly can be categorized into the second type of anomaly when the surface area percentage is less than the reference percentage.

In a particular exemplary application, the reference percentage may be from 50% to 70%. In certain instances, the one or more anomalies may be categorized without evaluation of the size. For example, when one anomaly is identified in a map, categorization of the anomaly may be performed based on evaluation of a feature other than the size, such as the shape, edge sharpness, or any combination thereof.

In a particular aspect, a second threshold may be applied to the map to facilitate evaluation of the size of one or more anomalies or categorization of the one or more anomalies. In an example, the second threshold may include a size threshold including the reference percentage.

Figure 8:
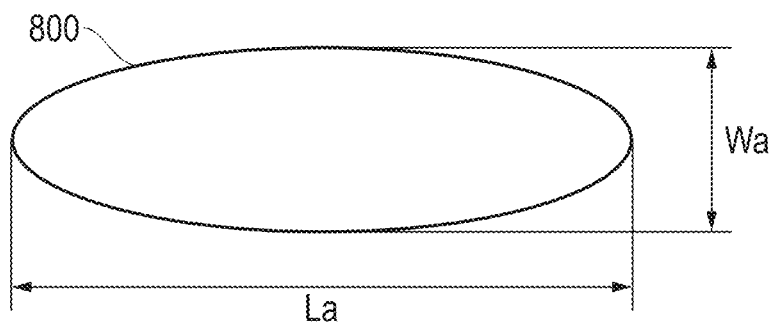
FIG. 8 includes an illustration of an anomaly according to an embodiment.

In a further aspect, evaluation of the shape of the one or more anomalies may be performed to facilitate categorization of the one or more anomalies. In a particular aspect, evaluation of the shape of the one or more anomalies may be performed following evaluation of the size of the one or more anomalies. For example, shape evaluation may be performed on one or more anomalies having a size at or above the second threshold. In another aspect, evaluation of the shape may include determining an aspect ratio of width:length (Wa:La) of the one or more anomalies and comparing the aspect ratio with a reference aspect ratio. FIG. 8 includes an illustration of an anomaly 800 having a length, La, in the long axis, and width in the short axis, Wa. In particular examples, the reference aspect ratio may be predetermined based on historical data including aspect ratios of anomalies corresponding to a defect and non-defect anomalies, and help distinguish a defect anomaly from a non-defect anomaly. Alternatively, the reference aspect ratio may be determined by evaluating the aspect ratios of a group of objects known to have no defect and another group of similar objects known to have defects. The aspect ratio that allows minimum false positive and false negative error rates may be used as a reference aspect ratio and also stored for inspecting similar objects in the future. In at least one aspect, evaluation of the shape may be performed independently from evaluation of the size of the anomaly. For example, evaluation of the shape may be performed prior to evaluation of the size of the one or more anomalies.

In another particular aspect, the one or more anomalies may be categorized into the first type of anomaly or the second type of anomaly based on evaluation of the shape. For example, an anomaly may be categorized into the first type of anomaly when the aspect ratio of Wa:La is less than the reference aspect ratio. In another example, an anomaly can be categorized into the second type of anomaly when the aspect ratio of Wa:La is at least or greater than the reference aspect ratio.

In a further example, the reference aspect ratio of Wa:La may be at most 1, at most 0.9, at most 0.8, at most 0.7, at most 0.6, at most 0.5 at most 0.4, or at most 0.3. In another example, the reference aspect ratio of Wa:La is at least 0.01, at least 0.02, at least 0.03, at least 0.04, at least 0.05, at least 0.06, at least 0.07, at least 0.08, at least 0.09, or at least 0.1. In still another example, the reference aspect ratio of Wa:La may be in a range including any of the minimum and maximum values noted herein.

In a further aspect, a third threshold may be applied to the map to facilitate evaluation of the shape of or categorizing the one or more anomalies. In a particular example, the third threshold may include the reference aspect ratio. In particular instances, the threshold may be set at an aspect ratio of at most 0.3.

In another aspect, edge sharpness may be evaluated to facilitate categorization of the one or more anomalies. In an example, an edge sharpness value of the one or more anomalies may be determined and compared to a reference edge sharpness value. The reference edge sharpness value may be predetermined based on historical data including surface area percentages of anomalies corresponding to a defect and non-defect anomalies and help distinguish a defect anomaly from a non-defect anomaly. Alternatively, the edge sharpness value may be determined by evaluating the edge sharpness values of a group of objects known to have no defect and another group of similar objects known to have defects. The reference edge sharpness value may allow minimum false negative and false positive error rates. The determined edge sharpness value may also be stored and used as a reference edge sharpness value for inspecting similar objects in the future. In a further aspect, the process 500 can include categorizing the one or more anomalies into the first or second type of anomaly based on evaluation of the edge sharpness value.

In an embodiment, the process 500 may include locating the one or more anomalies in the body 200. In an aspect, the location of the one or more anomalies in the map can correspond to the location of the one or more anomalies in the body 200. In certain instances, evaluation of the location of the one or more anomalies may facilitate categorization of the one or more anomalies. In another embodiment, the process 500 may include determining the orientation, the number, or any combination thereof, of the one or more anomalies. In an aspect, the orientation of the one or more anomalies in the body of 200 may be determined based on the orientation of the one or more anomalies in the map of the body 200. In a further aspect, the number of the one or more anomalies in the body of 200 may correspond to the number of the one or more anomalies in the map of the body 200. In certain instances, evaluation of the location and/or number of the one or more anomalies may facilitate categorization of the one or more anomalies.

In another embodiment, the process 500 may continue to block 503, providing a quality value associated with the body 200. In an aspect, the quality value may be provided based on evaluation of one or more criteria selected from the group consisting of the type, number, size, shape, position, orientation, edge sharpness, and any combination thereof of the one or more anomaly. In a particular aspect, the process 500 can include providing a quality value of zero when the body 200 includes a first type of anomaly. In another particular aspect, the process 500 can include providing a quality value of one when the one or more anomalies consists of the second type of anomaly.

In a particular embodiment, the sensing element may be configured to perform the process 500, 300, or any combination thereof in an automated manner. In another particular embodiment, the sensing element may be configured to perform the process 500, 300, or any combination thereof in a semi-automated manner. For example, the sensing element 105 may be configured to perform an automated analysis of the one or more anomalies. In another example, the sensing element may be configured to categorize the one or more anomalies into a first type of anomaly or a second type of anomaly based on the analysis of the one or more anomalies in an automated manner.

In particular embodiments, the process and system may be adapted to inspect ceramic objects. In more particular instances, the ceramic objects may have a relatively high density, relatively large size, or both.

In an embodiment, the body of the object can include a ceramic material including a mixture of coarse and fine grains. In an aspect, the body can include a ratio of maximum grain size to minimum grain size of at least 10, at least 20, at least 30, at least 50, at least 70, at least 80 at least 100, at least 200, or at least 300. In certain instances, the ratio of maximum grain size to minimum grain size may be up to 1000.

In an aspect, the body can include a maximum grain size of at most 10 mm, at most 8 mm, at most 6 mm, or at most 5 mm. In another aspect, the body can include a maximum grain size of at least 200 microns, at least 300 microns, at least 400 microns, or at least 500 microns. In a particular aspect, the maximum grain size may be greater than 500 microns, such as at least 700 microns, at least 900 microns, at least 1 mm, at least 2 mm, at least 3 mm, at least 4 mm, or at least 5 mm. It is to be appreciated the maximum grain size can be in a range including any of the minimum and maximum values noted herein.

In a further aspect, the body can include a minimum grain size of at most 500 microns, such as at most 400 microns, at most 200 microns, at most 100 microns, at most 80 microns, at most 60 microns, at most 40 microns, at most 20 microns, at most 10 microns, or at most 5 microns. In still another aspect, the body can include a minimum grain size of at least 0.5 microns, such as at least 1 micron, at least 2 microns, at least 3 microns, at least 4 microns, or at least 5 microns. It is to be appreciated the maximum grain size can be in a range including any of the minimum and maximum values noted herein.

In an embodiment, the body of the object can include a ceramic material including grains having a grain size of at least 0.5 microns and at most 5 mm. In a further embodiment, the body can include a particular content of grains having a certain grain size. In an aspect, the body can include at least 5 vol % of grains having a grain size of at least 200 microns and at most 10 mm for the total volume of the body, such as at least 10 vol %, at least 20 vol %, at least 30 vol %, at least 40 vol %, or at least 50 vol % of grains for the total volume of the body. In another aspect, the body can include at most 60 vol % of grains having the maximum grain size of at least 200 microns and at most 10 mm for the total volume of the body, such as at most 65 vol %, at most 60 vol %, at most 55 vol %, at most 50 vol %, or at most 45 vol % of grains having a grain size of at least 200 microns and at most 10 mm for the total volume of the body. It is to be appreciated the body can include a content of grains having a grain size from at least 200 microns to at most 10 mm in a range including any of the minimum and maximum values noted herein.

In another aspect, the body can include at most 70 vol % of grains having a grain size of at least 0.5 microns and at most 5 microns, such as at most 65 vol %, at most 60 vol %, at most 55 vol %, at most 50 vol %, or at most 45 vol % of grains having a grain size of at least 0.5 microns and at most 5 microns for the total volume of the body. In a further aspect, the ceramic body can include at least 5 vol % of grains having a grain size of at least 0.5 microns and most 5 microns, such as at least 10 vol %, at least 20 vol %, at least 30 vol %, at least 40 vol %, or at least 50 vol % of grains having a grain size of at least 0.5 microns and at most 5 microns for the total volume of the body. It is to be appreciated the body can include a content of grains having a grain size from at least 0.5 microns to at most 5 microns in a range including any of the minimum and maximum values noted herein.

In an embodiment, the object can include a body including a refractory material. In an aspect, the body can include an oxide, a nitride, a carbide, a phosphate, or any combination thereof. For example, the body can include a metal oxide including chromium, zirconium, titanium, aluminum, silicon, iron, an alkaline earth metal element, or any combination thereof.

In an embodiment, the body can include a particular content of chromium(III) oxide ($Cr_2O_3$). In an example, the body can include at least 25 wt % of chromium(III) oxide ($Cr_2O_3$) for a total weight of the body, such as at least 30 wt %, at least 40 wt %, at least 50 wt %, at least 60 wt %, at least 70 wt %, at least 80%, at least 90 wt %, at least 92 wt %, at least 95 wt %, at least 97 wt %, or at least 99 wt % of chromium(III) oxide ($Cr_2O_3$) for the total weigh to of the ceramic body. In a particular aspect, the body can include at least 90 wt % of chromium(III) oxide ($Cr_2O_3$) for a total weight of the body. In another aspect, the body can include at most 99 wt % of chromium(III) oxide ($Cr_2O_3$) for a total weight of the body, such as at most 97 wt %, at most 95 wt %, at most 93 wt %, or at most 91 wt % of chromium(III) oxide ($Cr_2O_3$) for a total weight of the body. In a further aspect, the body can include chromium(III) oxide ($Cr_2O_3$) in a content in a range including any of the maximum and minimum percentages noted herein. In at least one embodiment, the body may be essentially free of chromium(III) oxide ($Cr_2O_3$).

In an embodiment, the body can include a particular content of chromium(IV) oxide ($Cr_2O_4$). In an example, the body can include at least 25 wt % of chromium(IV) oxide ($Cr_2O_4$) for a total weight of the body, such as at least 30 wt %, at least 40 wt %, at least 50 wt %, at least 60 wt %, at least 70 wt %, at least 80%, at least 90 wt %, at least 92 wt %, at least 95 wt %, at least 97 wt %, or at least 99 wt % of chromium(IV) oxide ($Cr_2O_4$) for the total weigh to of the ceramic body. In a particular aspect, the body can include at least 90 wt % of chromium(IV) oxide ($Cr_2O_4$) for a total weight of the body. In another aspect, the body can include at most 99 wt % of chromium(IV) oxide ($Cr_2O_4$) for a total weight of the body, such as at most 97 wt %, at most 95 wt %, at most 93 wt %, or at most 91 wt % of chromium(IV) oxide ($Cr_2O_4$) for a total weight of the body. In a further aspect, the body can include chromium(IV) oxide ($Cr_2O_4$) in a content in a range including any of the maximum and minimum percentages noted herein. In at least one embodiment, the body may be essentially free of chromium(IV) oxide ($Cr_2O_4$).

In an embodiment, the body can include a particular content of titanium oxide ($TiO_2$). In an aspect, the body may include less than 50 wt % of titanium oxide ($TiO_2$) for a total weight of the body, such as at most 40 wt %, at most 30 wt %, at most 20 wt %, at most 10 wt %, at most 5 wt %, at most 4 wt %, at most 3 wt %, at most 2 wt %, or at most 1 wt % titanium oxide for the total weight of the body. In another aspect, the body can include at least 0.5 wt % of titanium oxide ($TiO_2$) for a total weight of the body, such as at least 1 wt %, at least 2 wt %, at least 5 wt %, at least 7 wt %, at least 9 wt %, or at least 10 wt % of titanium oxide ($TiO_2$) for the total weight of the ceramic body. In a further aspect, the body can include titanium oxide ($TiO_2$) in a content in a range including any of the maximum and minimum percentages noted herein. In at least one embodiment, the body may be essentially free of titanium oxide ($TiO_2$).

In an embodiment, the body can include zirconium oxide ($ZrO_2$). In an aspect, the body can include at most 80 wt % of zirconium oxide ($ZrO_2$) for a total weight of the body, such as at most 70 wt %, at most 60 wt %, at most 50 wt %, less than 50 wt %, at most 45 wt %, at most 40 wt %, at most 35 wt %, at most 30 wt %, at most 20 wt %, at most 10 wt %, at most 5 wt %, at most 4 wt %, at most 3 wt %, at most 2 wt %, or at most 1 wt % zirconium oxide ($ZrO_2$) for the total weight of the body. In another aspect, the body can include at least 0.5 wt % of zirconium oxide ($ZrO_2$) for a total weight of the body, such as at least 1 wt %, at least 2 wt %, at least 5 wt %, at least 7 wt %, at least 9 wt %, at least 10 wt %, at least 15 wt %, at least 20 wt %, at least 25 wt %, at least 30 wt %, at least 32 wt %, at least 36 wt %, at least 40 wt %, at least 41 wt %, or at least 45 wt % of zirconium oxide ($ZrO_2$) for the total weight of the body. In a further aspect, the body can include a content of zirconium oxide ($ZrO_2$) in a range including any of the minimum and maximum percentages noted herein. In at least one embodiment, the body may be essentially free of zirconium oxide ($ZrO_2$).

In an embodiment, the body can include aluminum oxide. In an aspect, the body can include at most 70 wt % of aluminum oxide ($Al_2O_3$) for a total weight of the body, such as at most 65 wt %, at most 60 wt %, at most 50 wt %, less than 50 wt %, at most 47 wt %, at most 40 wt %, at most 30 wt %, at most 20 wt %, at most 10 wt %, at most 5 wt %, at most 4 wt %, at most 3 wt %, at most 2 wt %, or at most 1 wt % aluminum oxide ($Al_2O_3$) for the total weight of the body. In an aspect, the body can include at least 0.5 wt % of aluminum oxide ($Al_2O_3$) for a total weight of the body, such as at least 1 wt %, at least 2 wt %, at least 5 wt %, at least 7 wt %, at least 9 wt %, or at least 10 wt % of aluminum oxide ($Al_2O_3$) for the total weight of the body. In a further aspect, the body can include aluminum oxide ($Al_2O_3$) in a content in a range including any of the maximum and minimum percentages noted herein. In a particular aspect, the body can consist essentially of aluminum oxide ($Al_2O_3$). In at least one embodiment, the body may be essentially free of aluminum oxide ($Al_2O_3$).

In an embodiment, the body can include silicon oxide. In an aspect, the body can include less than 50 wt % of silicon oxide ($SiO_2$), such as at most 40 wt %, at most 30 wt %, at most 20 wt %, at most 15 wt %, at most 12 wt %, at most 10 wt %, at most 5 wt %, at most 4 wt %, at most 3 wt %, at most 2 wt %, or at most 1 wt % silicon oxide ($SiO_2$) for a total weight of the body. In another aspect, the body can include at least 0.5 wt % of silicon oxide ($SiO_2$) for a total weight of the ceramic body, such as at least 1 wt %, at least 2 wt %, at least 5 wt %, at least 7 wt %, at least 9 wt %, or at least 10 wt % of silicon oxide ($SiO_2$) for the total weight of the ceramic body. In a further aspect, the body can include silicon oxide ($SiO_2$) in a content in a range including any of the minimum and maximum percentages noted herein. In at least one embodiment, the body can be essentially free of silicon oxide ($SiO_2$).

In an embodiment, the body can include one or more alkaline earth metal oxide. In an aspect, the body may include a total content of the alkaline earth metal oxide of up to 10 wt % for a total weight of the body, such as at most 9 wt %, at most 8 wt %, at most 7 wt %, at most 6 wt %, at most 5 wt %, at most 4 wt %, or at most 3 wt % for a total weight of the body. In a further aspect, the body can include a total content of alkaline earth oxide of at least 0.1 wt % for a total weight of the body, such as at least 0.3 wt %, at least 0.5 wt %, at least 0.8 wt %, at least 1 wt %, or at least 2 wt % for a total weight of the body. In still another aspect, the body can include a total content of alkaline earth oxide in a range including any of the minimum and maximum percentages noted herein. In at least one embodiment, the body may be essentially free of alkaline earth oxide.

In a further embodiment, the body can include magnesium oxide (MgO). In an aspect, the body can include at most 10 wt % of magnesium oxide (MgO) for a total weight of the body, such as at most 9 wt %, at most 8 wt %, at most 7 wt %, at most 6 wt %, at most 5 wt %, at most 4 wt %, or at most 3 wt % for a total weight of the body. In still another aspect, the body can include at least 0.1 wt % of magnesium oxide (MgO) for a total weight of the body, such as at least 0.3 wt %, at least 0.5 wt %, at least 0.8 wt %, at least 1 wt %, or at least 2 wt % for a total weight of the body. In a further aspect, the body can include a content of magnesium oxide (MgO) in a range including any of the minimum and maximum percentages noted herein. In at least one embodiment, the body may be essentially free of magnesium oxide (MgO).

In an embodiment, the body can include a phosphate. In an aspect, the body can include a phosphate of at most 5 wt % for a total weight of the body, such as at most 4 wt %, or at most 3 wt % for the total weight of the body. In another aspect, the body can include at least 0.1 wt % of a phosphate for a total weight of the ceramic body, at least 0.3 wt %, at least 0.5 wt %, at least 0.8 wt %, at least 1 wt %, or at least 2 wt % for the total weight of the body. In a further aspect, the body can include a content of a phosphate in a range including any of the minimum and maximum percentages noted herein. In at least one embodiment, the body may be essentially free of a phosphate.

In another embodiment, the body may include iron oxide ($Fe_2O_3$). In an aspect, the body can include at most 5 wt % of iron oxide ($Fe_2O_3$) for a total weight of the body, such as at most 4 wt %, or at most 3 wt % for a total weight of the body. In another aspect, the body can include at least 0.1 wt % of iron oxide ($Fe_2O_3$) for a total weight of the body, such as at least 0.3 wt %, at least 0.5 wt %, at least 0.8 wt %, at least 1 wt %, or at least 2 wt % for a total weight of the body. In a further aspect, the body can include a content of iron oxide ($Fe_2O_3$) in a range including any of the minimum and maximum percentages noted herein. In at least one embodiment, the body may be essentially free of iron oxide ($Fe_2O_3$).

In particular embodiments, the object can include a ceramic body including chromium(III) oxide ($Cr_2O_3$). In an aspect, the body can include chromium(III) oxide ($Cr_2O_3$) and one or more oxide selected from the group consisting of chromium(IV) oxide ($Cr_2O_4$), titanium oxide ($TiO_2$), zirconium oxide ($ZrO_2$), and silicon oxide ($SiO_2$). In particular aspects, the body can include at least 80 wt % or at least 90 wt % of chromium(III) oxide ($Cr_2O_3$) for the total weight of the body and one or more oxide selected from the group consisting of titanium oxide ($TiO_2$), zirconium oxide ($ZrO_2$), and silicon oxide ($SiO_2$), wherein the total content of the one or more oxide can be up to 20 wt % or up to 10 wt % for the total weight of the body. For example, a particular composition of the body can include at least 90 wt % of chromium (III) oxide ($Cr_2O_3$) and up to 10 wt % of titanium oxide ($TiO_2$), zirconium oxide ($ZrO_2$), or a combination thereof. Another particular example of the object can include a body including at least 80 wt % of chromium(III) oxide ($Cr_2O_3$) and up to 20 wt % of titanium oxide ($TiO_2$). In a further aspect, the body may include a total content of chromium (III) oxide ($Cr_2O_3$) and aluminum oxide ($Al_2O_3$) of greater than 50 wt % and may further include zirconium oxide ($ZrO_2$), silicon oxide ($SiO_2$), or a combination thereof. In still another aspect, the body can include at least 90 wt % of chromium(IV) oxide ($Cr_2O_4$) and a total of up to 10 wt % of titanium oxide ($TiO_2$), zirconium oxide ($ZrO_2$), and chromium(III) oxide ($Cr_2O_3$). It is to be appreciated the materials for making the body of the object may include a trace amount of one or more impurities that remain in the finally formed body. The total content of impurities may be up to 5 wt % for the total weight of the body.

In an embodiment, the body can have a particular density. In an aspect, the body can have a density of at least 2.8 g/cm$^3$, such as at least 3.0 g/cm$^3$, at least 3.2 g/cm$^3$, at least 3.5 g/cm$^3$, at least 3.8 g/cm$^3$, at least 4.0 g/cm$^3$, at least 4.1 g/cm$^3$, or at least 4.2 g/cm$^3$. In another aspect, the body may have a density of at most 8.0 g/cm$^3$, such as at most 7.5 g/cm$^3$, at most 7.0 g/cm$^3$, at most 6.5 g/cm$^3$, at most 6.0 g/cm$^3$, at most 5.5 g/cm$^3$, at most 5.4 g/cm$^3$, at most 5.2 g/cm$^3$, at most 5.0 g/cm$^3$, at most 4.9 g/cm$^3$, at most 4.7 g/cm$^3$, at most 4.5 g/cm$^3$, at most 4.3 g/cm$^3$, or at most 4.2 g/cm$^3$. In a further aspect, the body can include a density in a range including any of the minimum and maximum values noted herein.

In an embodiment, the object can include a relatively dense body. In an aspect, the body can include a density of at least 90% of a theoretical density, such as at least 92%, at least 95%, at least 98%, at least 99%, at least 99.5%, or at least 99.9% of the theoretical density. In another aspect, the body can have a density of at most 99.9% of a theoretical density, at most 99.5%, at most 99.2%, at most 99%, at most 98%, at most 96%, or at most 95% of the theoretical density. In a further aspect, the body can include a density in a range including any of the minimum and maximum percentages noted herein.

In an embodiment, the object can include a body including porosity. In an aspect, the body can include an open porosity, a closed porosity, or a combination thereof. In a further aspect, a majority of the porosity can be open porosity. In a particular example, the body can include a porosity consisting essentially of open porosity. In another aspect, a majority of the porosity can be closed porosity. For instance, the body can include a porosity consisting essentially of closed porosity.

In another aspect, the body can include a porosity of at least 5 vol %, for a total volume of the ceramic body, such as at least 7 vol %, at least 9 vol %, at least 10 vol %, at least 12 vol %, at least 14 vol %, at least 15 vol %, or at least 16 vol % for the total volume of the ceramic body. In a further aspect, the body can include a porosity of at most 30 vol % for a total volume of the body, such as at most 25 vol %, at most 22 vol %, at most 20 vol %, at most 18 vol %, at most 16 vol %, at most 10 vol %, or at most 5 vol % for the total volume of the body. In still another aspect, the body can include a porosity in a range including any of the minimum and maximum percentages noted herein.

In an embodiment, the body can include pores having a particular aspect ratio of length:width. In an aspect, the body can include pores having an average aspect ratio of length:width of at least 1, such as at least 1.1, at least 1.3, at least 1.5, at least 1.7, at least 2, at least 3, at least 4, at least 5, at least 8, or at least 10. In another aspect, the body can include a porosity including pores having an average aspect ratio of length:width of at most 100, at most 80, at most 60, at most 50, at most 40, at most 30, at most 20, at most 10, or at most 5. In a further aspect, the body can include pores having an average aspect ratio of length:width in a range including any of the minimum and maximum values noted herein. In particular aspects, the majority of the pores are elongated pores. In another particular aspect, the body can include pores having an average aspect ratio of length:width is greater than 1. In still another aspect, the body can include a porosity including substantially spherical pores.

In an embodiment, the body can include pores having a particular size. In an aspect, the body can include pores having an average width of at least 4 microns, at least 6 microns, at least 10 microns, at least 20 microns, at least 30 microns, at least 40 microns, at least 50 microns, at least 70 microns, at least 80 microns, at least 100 microns, at least 200 microns, at least 300 microns, at least 500 microns, at least 700 microns, at least 1 mm, at least 3 mm, at least 5 mm, or at least 7 mm. In another aspect, the body can include pores having an average width of at most 10 mm, such as at most 8 mm, at most 6 mm, at most 4 mm, at most 2 mm, at most 1 mm, or at most 800 microns. In a further aspect, the body can include pores having an average width in a range including any of the minimum and maximum values noted herein. In particular aspects, the body can include a porosity including substantially spherical pores, wherein the width is the diameter of the pores. In a more particular aspect, the body can include substantially spherical pores having an average diameter in a range from 50 microns to 8 mm.

Many different aspects and embodiments are possible. Some of these aspects and embodiments are described below. After reading this specification, those skilled in the art will appreciate that these aspects and embodiments are only illustrative and do not limit the scope of the present invention. Embodiments may be in accordance with any one or more of the embodiments as listed below.

Embodiments

Embodiment 1. A process of inspecting a ceramic body, comprising: positioning a first and second ultrasonic element relative to the ceramic body, wherein the first and second ultrasonic elements are offset in a direction orthogonal to a longitudinal axis of the ceramic body; and introducing ultrasonic signals into the ceramic body.

Embodiment 2. A process of inspecting a ceramic body, comprising: introducing ultrasonic signals into the ceramic body; receiving the ultrasonic signals leaving the ceramic body; creating a map of the ceramic body including at least one anomaly based on the received ultrasonic signals; and providing a quality value associated with the ceramic body based on evaluation of one or more criteria selected from the group consisting of the type, number, size, shape, position, orientation, edge sharpness, and any combination thereof of the at least one anomaly.

Embodiment 3. The process of any one of embodiments 1 to 2, wherein the ceramic body comprises a mixture of coarse and fine grains.

Embodiment 4. The process of any one of embodiments 1 to 3, wherein the ceramic body comprises a maximum grain size of grains of at most 10 mm, at most 8 mm, at most 6 mm, or at most 5 mm.

Embodiment 5. The process of any one of embodiments 1 to 4, wherein the ceramic body comprises a maximum grain size of grains of at least 200 microns, at least 300 microns, at least 400 microns, or at least 500 microns.

Embodiment 6. The process of any one of embodiments 1 to 5, wherein the ceramic body comprises a maximum grain size of grains of greater than 500 microns, at least 700 microns, at least 900 microns, at least 1 mm, at least 2 mm, at least 3 mm, at least 4 mm, or at least 5 mm.

Embodiment 7. The process of any one of embodiments 1 to 6, wherein the ceramic body comprises at least 5 vol % of grains having a grain size of at least 200 microns and at most 10 mm for the total volume of the body, at least 10 vol %, at least 20 vol %, at least 30 vol %, at least 40 vol %, or at least 50 vol % of grains having a grain size of at least 200 microns and at most 10 mm for the total volume of the body.

Embodiment 8. The process of any one of embodiments 1 to 7, wherein the ceramic body comprises at most 70 vol % of grains having a grain size of at least 200 microns and at most 10 mm for the total volume of the body, at most 65 vol %, at most 60 vol %, at most 55 vol %, at most 50 vol %, or at most 45 vol % of grains having a grain size of at least 200 microns and at most 10 mm for the total volume of the body.

Embodiment 9. The process of any one of embodiments 1 to 8, wherein the ceramic body comprises a minimum grain size of grains of at most 500 microns, at most 400 microns, at most 200 microns, at most 100 microns, at most 80 microns, at most 60 microns, at most 40 microns, at most 20 microns, at most 10 microns, or at most 5 microns.

Embodiment 10. The process of any one of embodiments 1 to 9, wherein the ceramic body comprises a minimum grain size of grains of at least 0.5 microns, at least 1 micron, at least 2 microns, at least 3 microns, at least 4 microns, or at least 5 microns.

Embodiment 11. The process of any one of embodiments 1 to 10, wherein the ceramic body comprises at most 70 vol % of grains having a grain size of at least 0.5 microns and at most 5 microns, at most 65 vol %, at most 60 vol %, at most 55 vol %, at most 50 vol %, or at most 45 vol % of grains having a grain size of at least 0.5 microns and at most 5 microns for the total volume of the body.

Embodiment 12. The process of any one of embodiments 1 to 11, wherein the ceramic body comprises at least 5 vol % of grains having a grain size of at least 0.5 microns and most 5 microns, at least 10 vol %, at least 20 vol %, at least 30 vol %, at least 40 vol %, or at least 50 vol % of grains having a grain size of at least 0.5 microns and at most 5 microns for the total volume of the body.

Embodiment 13. The process of any one of embodiments 1 to 12, wherein the ceramic body comprises grains having a grain size of at least 0.5 microns and at most 5 mm.

Embodiment 14. The process of any one of embodiments 1 to 13, wherein the ceramic body comprises a refractory material.

Embodiment 15. The process of any one of embodiments 1 to 14, wherein the ceramic body comprises an oxide, a nitride, a carbide, a phosphate, or any combination thereof.

Embodiment 16. The process of any one of embodiments 1 to 15, wherein the ceramic body comprises a metal oxide comprising chromium, zirconium, titanium, aluminum, silicon, iron, an alkaline earth metal element, or any combination thereof.

Embodiment 17. The process of any one of embodiments 1 to 16, wherein the ceramic body comprises at least 25 wt % of chromium oxide for a total weight of the ceramic body, at least 30 wt %, at least 40 wt %, at least 50 wt %, at least 60 wt %, at least 70 wt %, at least 80%, at least 90 wt %, at least 92 wt %, at least 95 wt %, at least 97 wt %, or at least 99 wt % chromium oxide for the total weight of the ceramic body.

Embodiment 18. The process of any one of embodiments 1 to 16, wherein the ceramic body is essentially free of chromium oxide.

Embodiment 19. The process of any one of embodiments 1 to 16, wherein the ceramic body comprises at most 80 wt % of zirconium oxide for a total weight of the ceramic body, at most 70 wt %, at most 60 wt %, at most 50 wt %, less than 50 wt %, at most 45 wt %, at most 40 wt %, at most 35 wt %, at most 30 wt %, at most 20 wt %, at most 10 wt %, at most 5 wt %, at most 4 wt %, at most 3 wt %, at most 2 wt %, or at most 1 wt % zirconium oxide for the total weight of the ceramic body.

Embodiment 20. The process of any one of embodiments 1 to 16, wherein the ceramic body comprises at least 0.5 wt % of zirconium oxide for a total weight of the ceramic body, at least 1 wt %, at least 2 wt %, at least 5 wt %, at least 7 wt %, at least 9 wt %, at least 10 wt %, at least 15 wt %, at least 20 wt %, at least 25 wt %, at least 30 wt %, at least 32 wt %, at least 36 wt %, at least 40 wt %, at least 41 wt %, or at least 45 wt % of zirconium oxide for the total weight of the ceramic body.

Embodiment 21. The process of any one of embodiments 1 to 20, wherein the ceramic body is essentially free of zirconium oxide.

Embodiment 22. The process of any one of embodiments 1 to 16, wherein the ceramic body comprises less than 50 wt % of titanium oxide for a total weight of the ceramic body, at most 40 wt %, at most 30 wt %, at most 20 wt %, at most 10 wt %, at most 5 wt %, at most 4 wt %, at most 3 wt %, at most 2 wt %, or at most 1 wt % titanium oxide for the total weight of the ceramic body.

Embodiment 23. The process of any one of embodiments 1 to 16, wherein the ceramic body comprises at least 0.5 wt % of titanium oxide for a total weight of the ceramic body, at least 1 wt %, at least 2 wt %, at least 5 wt %, at least 7 wt %, at least 9 wt %, or at least 10 wt % of titanium oxide for the total weight of the ceramic body.

Embodiment 24. The process of any one of embodiments 1 to 16, wherein the ceramic body is essentially free of titanium oxide.

Embodiment 25. The process of any one of embodiments 1 to 16, wherein the ceramic body comprises at most 70 wt % of aluminum oxide for a total weight of the ceramic body, at most 65 wt %, at most 60 wt %, at most 50 wt %, less than 50 wt %, at most 47 wt %, at most 40 wt %, at most 30 wt %, at most 20 wt %, at most 10 wt %, at most 5 wt %, at most 4 wt %, at most 3 wt %, at most 2 wt %, or at most 1 wt % aluminum oxide for the total weight of the ceramic body.

Embodiment 26. The process of any one of embodiments 1 to 16, wherein the ceramic body comprises at least 0.5 wt % of aluminum oxide for a total weight of the ceramic body, at least 1 wt %, at least 2 wt %, at least 5 wt %, at least 7 wt %, at least 9 wt %, or at least 10 wt % of aluminum oxide for the total weight of the ceramic body.

Embodiment 27. The process of any one of embodiments 1 to 16, wherein the ceramic body consists essentially of aluminum oxide.

Embodiment 28. The process of any one of embodiments 1 to 16, wherein the ceramic body is essentially free of aluminum oxide.

Embodiment 29. The process of any one of embodiments 1 to 16, wherein the ceramic body comprises less than 50 wt % of silicon oxide, at most 40 wt %, at most 30 wt %, at most 20 wt %, at most 15 wt %, at most 12 wt %, at most 10 wt %, at most 5 wt %, at most 4 wt %, at most 3 wt %, at most 2 wt %, or at most 1 wt % silicon oxide.

Embodiment 30. The process of any one of embodiments 1 to 16, wherein the ceramic body comprises at least 0.5 wt % of silicon oxide for a total weight of the ceramic body, at least 1 wt %, at least 2 wt %, at least 5 wt %, at least 7 wt %, at least 9 wt %, or at least 10 wt % of silicon oxide for the total weight of the ceramic body.

Embodiment 31. The process of any one of embodiments 1 to 16, wherein the ceramic body is essentially free of silicon oxide.

Embodiment 32. The process of any one of embodiments 1 to 16, wherein the ceramic body comprises one or more alkaline earth metal oxide, wherein a total content of the alkaline earth metal oxide is at most 10 wt % for a total weight of the ceramic body, at most 9 wt %, at most 8 wt %, at most 7 wt %, at most 6 wt %, at most 5 wt %, at most 4 wt %, or at most 3 wt % for a total weight of the ceramic body.

Embodiment 33. The process of any one of embodiments 1 to 16, wherein the ceramic body comprises magnesium oxide in a content of at most 10 wt % for a total weight of the ceramic body, at most 9 wt %, at most 8 wt %, at most 7 wt %, at most 6 wt %, at most 5 wt %, at most 4 wt %, or at most 3 wt % for a total weight of the body.

Embodiment 34. The process of any one of embodiments 1 to 16, wherein the ceramic body comprises magnesium oxide in a content of at least 0.1 wt % for a total weight of the ceramic body, at least 0.3 wt %, at least 0.5 wt %, at least 0.8 wt %, at least 1 wt %, or at least 2 wt % for a total weight of the ceramic body.

Embodiment 35. The process of any one of embodiments 1 to 16, wherein the ceramic body comprises a phosphate in a content of at most 5 wt %, at most 4 wt %, or at most 3 wt % for the total weight of the body.

Embodiment 36. The process of any one of embodiments 1 to 16, wherein the ceramic body comprises a phosphate in a content of at least 0.1 wt % for a total weight of the ceramic body, at least 0.3 wt %, at least 0.5 wt %, at least 0.8 wt %, at least 1 wt %, or at least 2 wt % for the total weight of the ceramic body.

Embodiment 37. The process of any one of embodiments 1 to 16, wherein the ceramic body is essentially free of a phosphate.

Embodiment 38. The process of any one of embodiments 1 to 16, wherein the ceramic body comprises iron oxide in a content of at most 5 wt %, at most 4 wt %, or at most 3 wt % for a total weight of the body.

Embodiment 39. The process of any one of embodiments 1 to 16, wherein the ceramic body comprises an iron oxide in a content of at least 0.1 wt % for a total weight of the ceramic body, at least 0.3 wt %, at least 0.5 wt %, at least 0.8 wt %, at least 1 wt %, or at least 2 wt % for a total weight of the ceramic body.

Embodiment 40. The process of any one of embodiments 1 to 16, wherein the ceramic body is essentially free of an iron oxide.

Embodiment 41. The process of any one of embodiments 1 to 40, wherein the ceramic body comprises a density of at least 2.8 g/cm$^3$, at least 3.0 g/cm$^3$, at least 3.2 g/cm$^3$, at least 3.5 g/cm$^3$, at least 3.8 g/cm$^3$, at least 4.0 g/cm$^3$, at least 4.1 g/cm$^3$, or at least 4.2 g/cm$^3$.

Embodiment 42. The process of any one of embodiments 1 to 41, wherein the ceramic body comprises a density of at most 8.0 g/cm$^3$, at most 7.5 g/cm$^3$, at most 7.0 g/cm$^3$, at most 6.5 g/cm$^3$, at most 6.0 g/cm$^3$, at most 5.5 g/cm$^3$, at most 5.4 g/cm$^3$, at most 5.2 g/cm$^3$, at most 5.0 g/cm$^3$, at most 4.9 g/cm$^3$, at most 4.7 g/cm$^3$, at most 4.5 g/cm$^3$, at most 4.3 g/cm$^3$, or at most 4.2 g/cm$^3$.

Embodiment 43. The process of any one of embodiments 1 to 31, wherein the ceramic body comprises a porosity including a type of porosity selected from the group consisting of an open porosity, a closed porosity, and a combination thereof.

Embodiment 44. The process of any one of embodiments 1 to 43, wherein the ceramic body comprises a porosity, wherein a majority of a volume of the porosity is open porosity.

Embodiment 45. The process of embodiment 44, wherein the ceramic body comprises porosity consisting essentially of open porosity.

Embodiment 46. The process of any one of embodiments 1 to 43, wherein the ceramic body comprises a porosity, wherein a majority of a volume of the porosity is closed porosity, wherein the porosity consists essentially of closed porosity.

Embodiment 47. The process of any one of embodiments 1 to 46, wherein the ceramic body comprises a porosity of at least 5 vol % for a total volume of the ceramic body, at least 7 vol %, at least 9 vol %, at least 10 vol %, at least 12 vol %, at least 14 vol %, at least 15 vol %, or at least 16 vol % for the total volume of the ceramic body.

Embodiment 48. The process of any one of embodiments 1 to 47, wherein the ceramic body comprises a porosity of at most 30 vol % for a total volume of the body, at most 25 vol %, at most 22 vol %, at most 20 vol %, at most 18 vol %, at most 16 vol %, at most 10 vol %, or at most 5 vol % for the total volume of the body.

Embodiment 49. The process of any one of embodiments 1 to 42, wherein the ceramic body comprises density of at least 90% of a theoretical density, at least 92%, at least 95%, at least 98%, at least 99%, at least 99.5%, or at least 99.9% of the theoretical density.

Embodiment 50. The process of any one of embodiments 1 to 42, wherein the ceramic body comprises density of at most 99.9% of a theoretical density, at most 99.5%, at most 99.2%, at most 99%, at most 98%, at most 96%, or at most 95% of the theoretical density.

Embodiment 51. The process of any one of embodiments 1 to 48, wherein the ceramic body comprises a porosity, wherein the porosity comprises elongated porosity.

Embodiment 52. The process of any one of embodiments 1 to 48, wherein the ceramic body comprises a porosity comprising pores having an average aspect ratio of length: width of at least 1, at least 1.1, at least 1.3, at least 1.5, at least 1.7, at least 2, at least 3, at least 4, at least 5, at least 8, or at least 10.

Embodiment 53. The process of any one of embodiments 1 to 48, wherein the ceramic body comprises a porosity including pores having an average aspect ratio of length: width of at most 100, at most 80, at most 60, at most 50, at most 40, at most 30, at most 20, at most 10, or at most 5.

Embodiment 54. The process of any one of embodiments 1 to 48, wherein the ceramic body comprises pores having a width of at least 4 microns, at least 6 microns, at least 10 microns, at least 20 microns, at least 30 microns, at least 40 microns, at least 50 microns, at least 70 microns, at least 80 microns, at least 100 microns, at least 200 microns, at least 300 microns, at least 500 microns, at least 700 microns, at least 1 mm, at least 3 mm, at least 5 mm, or at least 7 mm.

Embodiment 55. The process of any one of embodiments 1 to 48, wherein the ceramic body comprises pores having a width of at most 10 mm, at most 8 mm, at most 6 mm, at most 4 mm, at most 2 mm, at most 1 mm, or at most 800 microns.

Embodiment 56. The process of any one of embodiments 54 to 55, wherein the ceramic body comprises a porosity including substantially spherical pores, wherein the width is the diameter of the pores.

Embodiment 57. The process of embodiment 56, wherein the substantially spherical pores comprise the diameter in a range from 50 microns to 8 mm.

Embodiment 58. The process of any one of embodiments 1 to 56, wherein the ceramic body comprises a length, L, and a width, W, wherein L≥W.

Embodiment 59. The process of embodiment 58, wherein the width comprises a diameter, D, wherein L≥D.

Embodiment 60. The process of any one of embodiments 1 to 57, wherein the ceramic body comprises a thickness, T, wherein L≥W≥T.

Embodiment 61. The process of any one of embodiments 58 to 60, wherein the ceramic body comprises the length of at least 10 mm, at least 20 mm, at least 40 mm, at least 60 mm, at least 80 mm, at least 100 mm, at least 200 mm, at least 300 mm, at least 400 mm, at least 500 mm, at least 700 mm, at least 900 mm, at least 1000, at least 1200 mm, at least 1400 mm, or at least 1500 mm.

Embodiment 62. The process of any one of embodiments 58 to 61, wherein the ceramic body comprises the length of at most 5000 mm, at most 4000 mm, at most 3000 mm, at most 2000 mm, at most 1900 mm, at most 1800 mm, at most 1700 mm, at most 1600 mm, at most 1400 mm, or at most 1200 mm.

Embodiment 63. The process of any one of embodiments 58 to 62, wherein the ceramic body comprises the width of at least 5 mm, at least 10 mm, at least 20 mm, at least 25 mm, at least 30 mm, at least 40 mm, at least 50 mm, at least 60 mm, at least 70 mm, at least 80 mm, at least 90 mm, at least 100 mm, at least 200 mm, at least 300 mm, at least 400 mm, at least 500 mm, at least 550 mm, or at least 600 mm.

Embodiment 64. The process of any one of embodiments 58 to 63, wherein the ceramic body comprises the width of at most 1000 mm, at most 900 mm, at most 700 mm, at most 650 mm, at most 600 mm, at most 500 mm, at most 400 mm, at most 300 mm, at most 200 mm, or at most 100 mm.

Embodiment 65. The process of any one of embodiments 60 to 64, wherein the ceramic body comprises the thickness of at least 100 mm, at least 200 mm, at least 250 mm, at least 300 mm, or at least 350 mm.

Embodiment 66. The process of any one of embodiments 60 to 65, wherein the ceramic body comprises the thickness of at most 1000 mm, at most 900 mm, at most 700 mm, at most 600 mm, at most 500 mm, at most 400 mm, at most 350 mm, or at most 300 mm.

Embodiment 67. The process of embodiment 2, wherein introducing ultrasonic signals into the ceramic body comprises positioning a first and second ultrasonic element relative to the ceramic body, wherein the first and second ultrasonic elements are offset in a direction orthogonal to a longitudinal axis of the ceramic body.

Embodiment 68. The process of any one of embodiments 1 and 3 to 67, wherein the first and second ultrasonic elements are positioned at opposite sides of the ceramic body.

Embodiment 69. The process of any one of embodiments 1 and 3 to 68, wherein the first and second ultrasonic elements are spaced apart from the ceramic body.

Embodiment 70. The process of any one of embodiments 1 and 3 to 69, wherein the first and second ultrasonic elements comprise an air-coupled transducer.

Embodiment 71. The process of any one of embodiments 1 and 3 to 70, wherein the first and second ultrasonic elements are offset in a direction parallel to a longitudinal axis of the ceramic body.

Embodiment 72. The process of any one of embodiments 1 and 3 to 71, wherein the first and second ultrasonic elements are offset by at least 30% of a dimension of the first or second ultrasonic element in the direction orthogonal to the longitudinal axis of the ceramic body, at least 40%, at least 50%, at least 60%, at least 70%, at least 80%, or at least 90% of the dimension of the first or the second ultrasonic, wherein the dimension comprises a diameter, a width, a length, perimeter, or a thickness.

Embodiment 73. The process of any one of embodiments 1 and 3 to 72, wherein the first and second ultrasonic elements are offset by at most 5 times a dimension of the first or the second ultrasonic element, at most 4 times, at most 3 times, at most 2 times, or at most the dimension of first or the second ultrasonic elements, wherein the dimension comprises a diameter, a width, a length, perimeter, or a thickness.

Embodiment 74. The process of embodiment 72 or 73, wherein the first and second ultrasonic elements comprise a diameter, wherein the dimension comprises the diameter.

Embodiment 75. The process of any one of embodiments 1 and 3 to 74, wherein the first and second ultrasonic elements are offset in at least two directions of x-axis, y-axis, and z-axis.

Embodiment 76. The process of any one of embodiments 1 and 3 to 75, wherein the ceramic body comprises a length extending in the longitudinal axis.

Embodiment 77. The process of embodiment 76, wherein the longitudinal axis of the ceramic body extends in the x-axis, wherein the ceramic body comprises a width extending in the z-axis.

Embodiment 78. The process of any one of embodiments 1 and 3 to 77, wherein the ceramic body comprises a thickness extending in the y-axis.

Embodiment 79. The process of any one of embodiments 58 to 78, wherein the first and second ultrasonic elements are offset in an extending direction of the width by at least 5% of the width of the ceramic body, at least 10%, at least 20%, at least 35%, at least 50%, at least 70%, or at least 90% of the width of the ceramic body.

Embodiment 80. The process of any one of embodiments 58 to 79, wherein the first and second transducer are offset in an extending direction of the width by at most 50% of the width of the ceramic body, at most 45%, at most 40%, at most 30%, or at most 20% of the width of the ceramic body.

Embodiment 81. The process of any one of embodiments 58 to 80, wherein the first and second ultrasonic elements are offset in a direction of the longitudinal axis by at least 0.5% of the length, at least 1%, at least 2%, at least 5%, at least 8%, at least 10%, at least 20%, at least 30%, at least 50%, at least 70%, or at least 90% of the length of the ceramic body.

Embodiment 82. The process of any one of embodiments 58 to 81, wherein first and second ultrasonic elements are offset in a direction of the longitudinal axis of the ceramic body by at most 90% of the length of the ceramic body, at most 80%, at most 70%, at most 60%, at most 50%, at most 40%, at most 30%, at most 20%, at most 10%, or at most 5% of the length.

Embodiment 83. The process of any one of embodiments 58 to 82, wherein the first and second elements are offset in an extending direction of the thickness of the ceramic body by at least 1% of the thickness of the ceramic body, at least 2%, at least 5%, at least 8%, at least 10%, at least 20%, at least 30%, at least 40%, at least 50%, at least 70%, or at least 90% of the thickness of the ceramic body.

Embodiment 84. The process of any one of embodiments 58 to 83, wherein the first and second elements are offset in an extending direction of the thickness of the ceramic body by at most 90% of the thickness of the ceramic body, at most 80%, at most 70%, at most 60%, at most 50%, at most 40%, at most 30%, at most 20%, at most 10%, or at most 5% of the thickness of the ceramic body.

Embodiment 85. The process of any one of embodiments 1 and 3 to 84, wherein centers of the first and second elements are offset in the direction orthogonal to the longitudinal axis by at least 20 mm, at least 30 mm, at least 40 mm, or at least 50 mm.

Embodiment 86. The process of any one of embodiments 1 and 3 to 85, wherein centers of the first and second elements are offset in the direction orthogonal to the longitudinal axis by at most 200 mm, at most 190 mm, at most 180 mm, at most 160 mm, or at most 150 mm.

Embodiment 87. The process of any one of embodiments 1 and 3 to 86, wherein the first ultrasonic element is configured to transmit ultrasonic signals, and the second ultrasonic element is configured to receive ultrasonic signals.

Embodiment 88. The process of embodiment 87, wherein the first and second ultrasonic elements are configured to transmit and receive low frequency ultrasonic signals, respectively.

Embodiment 89. The process of any one of embodiments 1 to 88, wherein the ultrasonic signals comprise a frequency of at most 500 kHz, at most 400 kHz, at most 300 kHz, or at most 200 kHz.

Embodiment 90. The process of any one of embodiments 1 to 89, wherein the ultrasonic signals comprise a frequency of at least 5 kHz, at least 10 kHz, at least 50 kHz, at least 100 kHz, or at least 200 kHz.

Embodiment 91. The process of any one of embodiments 1 to 90, further comprising applying an initial voltage to the first or second ultrasonic element.

Embodiment 92. The process of embodiment 91, wherein the initial voltage is at least 100V, at least 200V, at least 300V, or at least 400V.

Embodiment 93. The process of embodiment 91 or 92, wherein the initial voltage is at most 800V, at most 700V, at most 600V, at most 500V, or at most 400V.

Embodiment 94. The process of any one of embodiments 1 to 93, comprising performing a scan of a surface of the ceramic body, wherein the surface comprises a side surface, an end surface, or a combination thereof.

Embodiment 95. The process of embodiment 94, wherein the ultrasonic signals are introduced into the ceramic body in a direction perpendicular to the surface of the ceramic body.

Embodiment 96. The process of any one of embodiments 94 to 95, comprising computing a histogram based on received ultrasonic signals.

Embodiment 97. The process of embodiment 96, comprising comparing the histogram to a reference to determine whether the scan is acceptable.

Embodiment 98. The process of embodiment 97, wherein when the scan is not acceptable, another scan of the surface is performed and another histogram is computed to determine whether another scan is acceptable.

Embodiment 99. The process of embodiment 97, wherein performing another scan comprises making a change to at least one acquisition parameters selected from the group consisting of offset of the first and second ultrasonic elements, initial voltage, gain and window parameters, and any combination thereof.

Embodiment 100. The process of any one of embodiments 1 to 78, further comprising acquiring imaging data based on received ultrasonic signals.

Embodiment 101. The process of embodiment 100, wherein the imaging data comprises time, velocity, amplitude, frequency, or any combination thereof.

Embodiment 102. The process of embodiment 1, further comprising creating a map of the ceramic body based on received ultrasonic signals.

Embodiment 103. The process of any one of embodiments 2 to 102, wherein the map comprises an amplitude map, a time-of-flight map, or a combination thereof.

Embodiment 104. The process of any one of embodiments 2 to 102, further comprising applying a predetermined threshold to the map of the ceramic body.

Embodiment 105. The process of embodiment 104, wherein the predetermined threshold is determined based on stored ultrasonic inspection data of at least 30 scans of similar ceramic bodies, at least 40, at least 50, at least 80, at least 100, or at least 200 scans of similar ceramic bodies.

Embodiment 106. The process of embodiment 104 or 105, wherein the predetermined threshold is at least 15%, at least 18%, or at least 20% of transmitted ultrasonic signals.

Embodiment 107. The process of any one of embodiments 104 to 106, wherein the threshold is at most 35%, at most 30%, at most 25%, or at most 20% of transmitted ultrasonic signals.

Embodiment 108. The process of any one of embodiments 2 to 107, further comprising identifying at least one anomaly in the map of the ceramic body.

Embodiment 109. The process of embodiment 108, wherein the at least one anomaly comprises a plurality of attenuated pixels.

Embodiment 110. The process of embodiment 108 or 109, further comprising analyzing a first anomaly of the at least one anomaly and categorizing the first anomaly of the at least one anomaly into a first type or a second type of anomaly.

Embodiment 111. The process of embodiment 110, wherein analyzing the first anomaly of the at least one anomaly comprises determining a percentage of a surface area of the first anomaly relative to a total surface area of the at least one anomaly; and comparing the percentage to a predetermined percentage.

Embodiment 112. The process of embodiment 109 or 110, further comprising extracting the at least one anomaly from the map; and applying a second threshold to the at least one anomaly.

Embodiment 113. The process of embodiment 112, wherein the second threshold is the predetermined percentage.

Embodiment 114. The process of any one of embodiments 111 to 113, comprising categorizing the first anomaly as the first type of anomaly, when the percentage of the surface area of the first anomaly is at least the predetermined percentage.

Embodiment 115. The process of any one of embodiments 111 to 113, comprising categorizing the first anomaly as the second type of anomaly, when the percentage of the surface area of the first anomaly is less than the predetermined percentage.

Embodiment 116. The process of any one of embodiments 111 to 115, further comprising analyzing a second anomaly of the at least one anomaly and categorizing the second anomaly of the at least one anomaly into a first type or a second type of anomaly.

Embodiment 117. The process of any one of embodiments 111 to 113 and 116, further comprising analyzing a shape of the first anomaly, the second anomaly, or both.

Embodiment 118. The process of embodiment 117, wherein analyzing the shape comprises determining an aspect ratio of width:length of the first anomaly, the second anomaly, or both.

Embodiment 119. The process of embodiment 118, further comprising applying a third threshold, wherein the third threshold comprises a predetermined width:length aspect ratio.

Embodiment 120. The process of embodiment 119, wherein the process further comprises: categorizing the first anomaly, the second anomaly, or both as the first type of anomaly when the aspect ratio is less than the predetermined aspect ratio; or categorizing the first anomaly, the second anomaly, or both as the second type of anomaly when the aspect ratio is greater than the predetermined aspect ratio.

Embodiment 121. The process of embodiment 116 or 117, wherein the predetermined width:length aspect ratio is based on stored ultrasonic inspection data.

Embodiment 122. The process of any one of embodiments 116 to 119, wherein the predetermined width:length aspect ratio is at most 1, at most 0.9, at most 0.8, at most 0.7, at most 0.6, at most 0.5 at most 0.4, or at most 0.3.

Embodiment 123. The process of any one of embodiments 116 to 120, wherein the predetermined width:length aspect ratio is at least 0.01, at least 0.02, at least 0.03, at least 0.04, at least 0.05, at least 0.06, at least 0.07, at least 0.08, at least 0.09, or at least 0.1.

Embodiment 124. The process of any one of embodiments 115 to 121, wherein analyzing the shape comprises determining an edge sharpness value of the first anomaly, the second anomaly, or both.

Embodiment 125. The process of embodiment 122, further comprising categorizing the first anomaly, the second anomaly, or both into a first or second type of anomaly based on the edge sharpness value.

Embodiment 126. The process of any one of embodiments 115 to 117 and 122, further comprising locating the first anomaly, second anomaly, or both.

Embodiment 127. The process of embodiment 124, further comprising categorizing the first anomaly, second anomaly, or both based on the location of the first anomaly, second anomaly, or both.

Embodiment 128. The process of any one of embodiments 115 to 117, 122, and 124, further comprising determining the orientation of the first anomaly, second anomaly, or both.

Embodiment 129. The process of embodiment 125, further comprising categorizing the first anomaly, second anomaly, or both based on orientation of the first anomaly, second anomaly, or both.

Embodiment 130. The process of any one of embodiments 93 to 127, further comprising performing a scan of the surface of the ceramic body, wherein performing the scan comprises aligning the first and second ultrasonic element in the direction parallel to the longitudinal axis, aligning the first and second element in the direction orthogonal to the longitudinal axis, or both.

Embodiment 131. The process of embodiment 1, further comprising providing a quality value associated with the ceramic body based on evaluation of one or more criteria selected from the group consisting of the type, number, size, shape, position, orientation, edge sharpness, and any combination thereof of the at least one anomaly.

Embodiment 132. The process of any one of embodiments 105 to 131, further comprising adding ultrasonic inspection data of the ceramic body to the stored ultrasonic inspection data.

Embodiment 133. The process of any one of embodiments 2 to 132, wherein the first type of anomaly corresponds to a defect including a crack.

Embodiment 134. The process of any one of embodiments 2 to 132, wherein the second type of anomaly corresponds to a non-defect including a density variation.

Embodiment 135. The process of embodiment 133 or 134, comprising providing a quality value of zero when the ceramic body includes a first type of anomaly.

Embodiment 136. The process of embodiment 133 or 134, comprising providing a quality value of one when the at least one anomaly consists of the second type of anomaly.

Embodiment 137. The process of any one of embodiments 110 to 136, wherein analyzing the first anomaly or the second anomaly of the at least one anomaly comprises automated analysis.

Embodiment 138. The process of any one of embodiments 1 to 137, wherein the process is an automated process.

Embodiment 139. The process of any one of embodiments 1 to 137, wherein the process is a semi-automated process.

Embodiment 140. An ultrasonic inspection system, comprising: a first ultrasonic element configured to introduce ultrasonic signals into a body of an object; a second ultrasonic element configured to receive the ultrasonic signals leaving the body of the object; and a processing element configured to create a map of the body including at least one anomaly and provide a quality value associated with the body based on evaluation of one or more criteria selected from the group consisting of the type, number, size, shape, position, orientation, edge sharpness, and any combination thereof of the at least one anomaly.

Embodiment 141. The ultrasonic inspection system of embodiment 140, wherein the processing element comprises a computing device, a processor, an ASIC, an FPGA, or any combination thereof.

Embodiment 142. The ultrasonic inspection system of embodiment 140 or 141, wherein the first and second ultrasonic elements comprise an air-coupled transducer.

Embodiment 143. The ultrasonic inspection system of any one of embodiments 140 to 142, wherein the first ultrasonic element is configured to transmit ultrasonic signals, and the second ultrasonic element is configured to receive ultrasonic signals.

Embodiment 144. The ultrasonic inspection system of any one of embodiments 140 to 143, wherein the first and second ultrasonic elements are configured to transmit and receive low-frequency ultrasonic signals, respectively.

Embodiment 145. The ultrasonic inspection system of any one of embodiments 140 to 144, wherein the processing element is configured to acquire imaging data based on received ultrasonic signals.

Embodiment 146. The ultrasonic inspection system of any one of embodiments 140 to 145, wherein the processing element is configured to identify at least one anomaly in the map of the body of the object.

Embodiment 147. The ultrasonic inspection system of embodiment 146, wherein the processing element is configured to perform an analysis of the at least one anomaly.

Embodiment 148. The ultrasonic inspection system of embodiment 147, wherein the process element is configured to perform an automated analysis.

Embodiment 149. The ultrasonic inspection system of any one of embodiments 147 and 148, wherein the processing element is configured to categorize the at least one anomaly into a first type of anomaly or a second type of anomaly.

Embodiment 150. The ultrasonic inspection system of any one of embodiments 140 to 149, wherein the ultrasonic inspection system is adapted to inspect a ceramic body.

Embodiment 151. The ultrasonic inspection system of any one of embodiments 140 to 150, wherein the processing element is configured to offset the first and second ultrasonic elements in a vertical direction.

Embodiment 152. The process or ultrasonic inspection system of any one of embodiments 2 to 151, wherein the map comprises a plan view image of a cross-section of the ceramic body.

Embodiment 153. The process or ultrasonic inspection system of any one of embodiments 2 to 152, wherein the map comprises a plan view image representative of an entire thickness of the ceramic body.

Embodiment 154. The process or ultrasonic inspection system of any one of embodiments 2 to 153, wherein the map comprises a 3-dimensional image of the ceramic body.

Embodiment 155. The process or ultrasonic inspection system of any one of embodiments 2 to 154, wherein creating the map comprises creating a map including more than two colors, a two-color map, or both.

EXAMPLES

Example 1

Figures 9A, 9B:
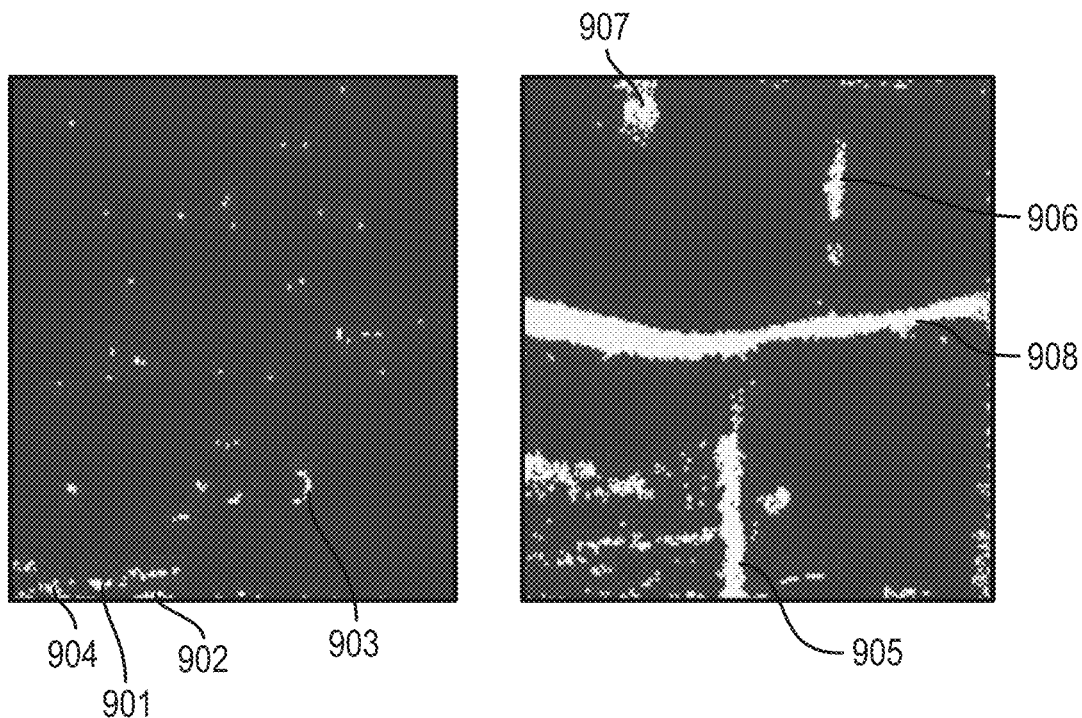
FIG. 9A includes a map including anomalies.
FIG. 9B includes a map according to embodiments herein.

An ultrasonic inspection of a block Sample S1 was conducted. The block had the dimension of 6×21×22 inches and at least 90 wt % of $Cr_2O_3$ and up to 10 wt % of $TiO_2$. The block included coarse and fine grains having the maximum grain size of 5 mm and minimum grain size of 5 microns. The block was heated to up to 900° C. and cooled rapidly to induce cracks by thermal shock. C-scan was performed on the reheated block by sending and receiving an ultrasonic signal through the block using air-coupled transducers in the manner as described in embodiments herein except that the transducers were aligned in the longitudinal axis and the direction orthogonal to the longitudinal axis and not offset. The 2-color image of the first scan is included in FIG. 9A. A second scan of the block was performed with offsetting the transducers in the directions orthogonal and parallel to the longitudinal axis, as described in embodiments herein. The 2-color image of the second scan is included in FIG. 9B.

After machining the surfaces of the block, internal cracks became visible at positions corresponding to the locations of anomaly 905 to 908 on the surfaces of the block, and the block broke along the crack at the position corresponding to the anomaly 908. Cracks were not found at positions corresponding to the positions of anomalies 901 to 904.

Example 2

A batch of blocks having the same composition as S1 and the size of 40×16×12 inches were inspected. The batch includes 52 good blocks and 4 blocks having cracks. C-scan was performed on the blocks of the batch as described in embodiments herein. Maps were generated and analyzed as described in embodiments herein. Table 1 includes the inspection results including numbers of blocks that were identified to have anomalies after each threshold was applied to the map. The first threshold is the attenuation threshold, 30% of transmission. The second threshold is the size threshold of 0.7. The third threshold is the aspect ratio threshold of 0.3.

TABLE 1

| Sample | Good | Cracked |
| --- | --- | --- |
| $1^{st}$ threshold | 20 | 4 |
| $2^{nd}$ threshold | 3 | 4 |
| $3^{rd}$ threshold | 2 | 4 |

Example 3

The same batch of blocks of Example 2 was inspected. The batch includes 52 good blocks and 4 blocks having cracks. C-scan was performed on the blocks of the batch as described in embodiments herein, the sensor voltage being 200V. Maps were generated and analyzed as described in embodiments herein. Table 2 includes the inspection results including numbers of blocks that were identified to have anomalies after each threshold was applied to the map. The first threshold is the attenuation threshold, 30% of transmission. The second threshold is the size threshold of 0.4. The third threshold is the aspect ratio threshold of 0.4.

TABLE 2

| Sample | Good | Cracked |
| --- | --- | --- |
| $1^{st}$ threshold | 25 | 4 |
| $2^{nd}$ threshold | 12 | 4 |
| $3^{rd}$ threshold | 10 | 4 |

Example 4

Another batch of blocks was inspected. The batch includes 10 good blocks and 10 blocks having cracks. C-scan was performed on the blocks of the batch as described in embodiments herein. Maps were generated and analyzed as described in embodiments herein. Table 3 includes the inspection results including numbers of blocks that were identified to have anomalies after each threshold was applied to the map. The first threshold is the attenuation threshold, 40% of transmission. The second threshold is the size threshold of 0.9. The third threshold is the aspect ratio threshold of 0.5.

TABLE 3

| Sample | Good | Cracked |
| --- | --- | --- |
| $1^{st}$ threshold | 4 | 10 |
| $2^{nd}$ threshold | 2 | 10 |
| $3^{rd}$ threshold | 2 | 10 |

Example 5

An ultrasonic inspection of a block Sample S5 was conducted. The block was isopressed having the length and width of 24 inches and thickness of 6 inches. The block included approximately 94.4-95.2 wt % of $Al_2O_3$, 2.8 wt % of $SiO_2$, 1-1.8 wt % of $ZrO_2$ and $HfO_2$, up to 0.4-0.6 wt % of $TiO_2$, and 0.1-0.2 wt % of $Fe_2O_3$ for the total weight of the block. It is to be appreciated the contents of all the components add up to 100 wt % even though some ranges are given for certain components. The block was formed with fine grains having the grain size 1 to 50 microns. The block had a density of 3.54 g/cc and porosity of less than 0.3 vol % for the total volume of the block.

The block was heated to up to 900° C. and cooled rapidly to induce cracks by thermal shock. C-scan was performed along the length and width directions of the block using air-coupled transducers. A first scan was conducted in the manner as described in embodiments herein except that the transducers were aligned in the longitudinal axis and the direction orthogonal to the longitudinal axis and not offset. The 2-color image of the first scan is included in FIG. 10A. After applying threshold as noted in embodiments herein, anomaly 1001 was characterized as an artifact. A second scan of the block was performed with offsetting the transducers in the directions orthogonal and parallel to the longitudinal axis, as described in embodiments herein. The 2-color image of the second scan is included in FIG. 10B. Anomalies 1002 to 005 were characterized as cracks. After machining the surfaces of the block, an internal cracks became visible where the anomalies 1001 to 1005 appeared on the surface of the block.

Example 6

An ultrasonic inspection of a block Sample S6 was conducted. The block was isopressed using fine grains having the grain size 1 to 50 microns and having the length of 42, width 12, and thickness 10 inches. The block included approximately up to 0.8 wt % of $Al_2O_3$, 32.5 wt % of $SiO_2$, 65.8 wt % of $ZrO_2$ and $HfO_2$, 1.1 wt % of $TiO_2$, and up to 0.8 wt % of $Fe_2O_3$ for the total weight of the block. It is to be appreciated the contents of all the components add up to 100 wt % even though some ranges are given for certain components. The block was formed having a density of 4.33 g/cc and porosity of less than 0.5 vol % for the total volume of the block.

Crack was induced in the similar manner as described in Example 1.

C-scan was performed along the length and width directions of the block using air-coupled transducers. A first scan was conducted in the manner as described in embodiments herein except that the transducers were aligned in the longitudinal axis and the direction orthogonal to the longitudinal axis and not offset. The 2-color image of the first scan is included in FIG. 11A. A second scan of the block was performed with offsetting the transducers in the directions orthogonal and parallel to the longitudinal axis, as described in embodiments herein. The 2-color image of the second scan is included in FIG. 11B.

After machining the surfaces of the block, an internal crack became visible where the locations of anomalies 1101 and 1102 appeared on the surfaces of the block. It is worth noting with only the presence of anomaly 1101, the block would not be considered as cracked. With the detection of anomaly 1102, it can be concluded the block has a crack.

Example 7

An ultrasonic inspection of a block Sample S7 was conducted. The block was vibrocasted had the length of 54 inches, width of 9 inches, and thickness of 5 to 10 inches. The block included approximately 61 wt % of $Al_2O_3$, 3 wt % of $SiO_2$, 4 wt % of $ZrO_2$ and $HfO_2$, up to 2 wt % of $TiO_2$, up to 2 wt % of $Fe_2O_3$, and 30 wt % of $Cr_2O_3$ for the total weight of the block. It is to be appreciated the contents of all the components add up to 100 wt % even though some ranges are given for certain components. The block included approximately 35 wt % of fine grains having the grain size up to 0.5 mm, and 37.5 wt % of fine grains having the grain size of 0.5 to 2 mm, and coarse grains having the grain size of 2 to 5 mm. The block had a density of 3.37 g/cc and porosity of 15 vol % for the total volume of the block.

Figure 12A:
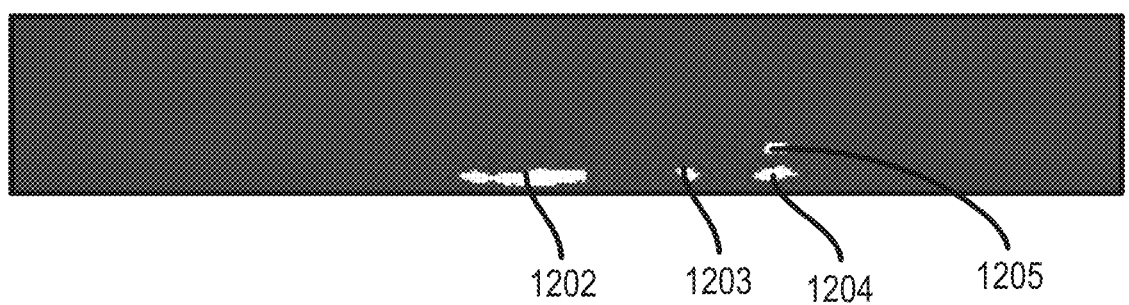
Figure 12B:
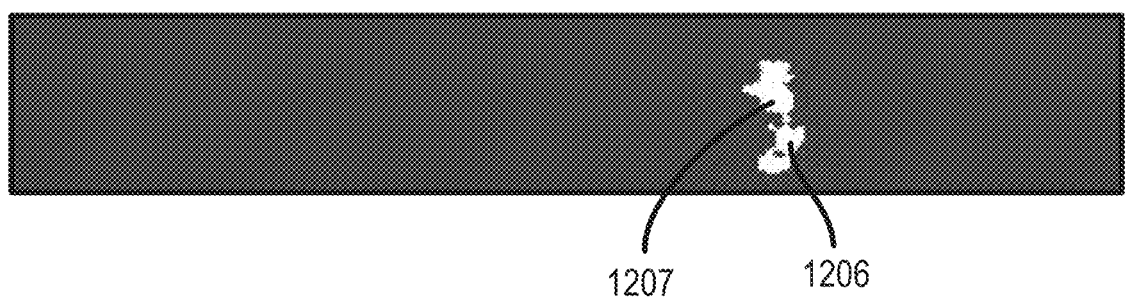

A first C-scan was performed on the block by using air-coupled transducers in the manner as described in embodiments herein except that the transducers were aligned in the longitudinal axis and the direction orthogonal to the longitudinal axis and not offset. The 2-color image of the first scan is included in FIG. 12A. A second scan of the block was performed with offsetting the transducers in the directions orthogonal and parallel to the longitudinal axis, as described in embodiments herein. The 2-color image of the second scan is included in FIG. 12B. After machining the surfaces of the block, an internal cracks became visible where the locations of anomalies 1206 to 1207 were on the surfaces of the block. Crack was not found at the position corresponding to the position of anomalies 1202 to 1205, indicating anomalies 1202 to 1205 were artifacts.

Example 8

Ultrasonic inspection of a block Sample S9 was conducted by offsetting the ultrasonic sensors by different distances in horizontal and/or vertical directions with the sample laid on a longitudinal side and the width of the sample in the vertical direction. The block has the dimension T×W×L of 6×21×22 inches and approximate 95 wt % of $Cr_2O_3$ and 5 wt % of $TiO_2$. The block included coarse and fine grains having the maximum grain size of 5 mm and minimum grain size of 5 microns. C-scan was performed on the block by sending and receiving an ultrasonic signal through the block using air-coupled transducers in the manner as described in embodiments herein. The transducers each has an outer diameter of 35 mm of the surface portion directly facing the sample and are offset as noted in Table 4 below.

Ultrasonic inspection of a block Sample S10 was conducted by offsetting the ultrasonic sensors by different distances in horizontal and/or vertical directions with the sample laid on a longitudinal side and the width of the sample in the vertical direction. The block had the dimension T×W×L of 6×21×22 inches and approximate 95 wt % of $Cr_2O_3$ and 5 wt % of $TiO_2$. The block included coarse and fine grains having the maximum grain size of 5 mm and minimum grain size of 5 microns. The block was heated to up to 900° C. and cooled rapidly to induce cracks by thermal shock. C-scan was performed on the reheated block by sending and receiving an ultrasonic signal through the block using air-coupled transducers in the manner as described in embodiments herein. The transducers each has an outer diameter of 35 mm of the surface portion directly facing the sample and are offset as noted in Table 4 below.

Ultrasonic inspection of a block Sample S11 was conducted by offsetting the ultrasonic sensors by different distances in horizontal and/or vertical directions with the sample laid on a longitudinal side and the width of the sample in the vertical direction. The block had the dimension T×W×L of 6×21×22 inches and approximate 95 wt % of $Cr_2O_3$ and 5 wt % of $TiO_2$. The block included coarse and fine grains having the maximum grain size of 5 mm and minimum grain size of 5 microns. The block was heated to up to 900° C. and cooled rapidly to induce cracks by thermal shock. C-scan was performed on the reheated block by sending and receiving an ultrasonic signal through the block using air-coupled transducers in the manner as described in embodiments herein. The transducers each has an outer diameter of 35 mm of the surface portion directly facing the sample and are offset as noted in Table 4 below.

TABLE 4

| Samples | Type of cracks | Scan # | Horizontal offset (mm) | Vertical offset (mm) | Detection of cracks |
|---|---|---|---|---|---|
| S9 | Vertical crack only | 1-1 | 35 | 50 | YES |
| | | 1-4 | 0 | 0 | NO |
| | | 1-5 | 40 | 32 | YES |
| | | 1-6 | 0 | 40 | NO |
| | | 1-7 | 40 | 0 | YES |
| | | 2-1 | 20 | 0 | NO |
| | | 2-2 | 28 | 0 | ALMOST |

TABLE 4-continued

| Samples | Type of cracks | Scan # | Horizontal offset (mm) | Vertical offset (mm) | Detection of cracks |
|---|---|---|---|---|---|
| | | 2-3 | 33 | 0 | YES |
| | | 2-4 | −33 | 0 | YES |
| | | 2-5 | 10 | 17 | NO |
| | | 2-6 | 10 | 30 | NO |
| | | 2-7 | −10 | 38 | NO |
| | | 2-8 | 0 | 40 | NO |
| | | 2-9 | 35 | 50 | YES |
| S10 | Horizontal and vertical cracks | 1 | 0 | 0 | NO |
| | | 2 | 35 | 50 | YES |
| | | 3 | 35 | 50 | YES |
| S11 | Horizontal and vertical cracks | 1 | 0 | 0 | NO |
| | | 2 | 35 | 50 | YES |

Example 9

Samples S10 and S11 are to be inspected by using the same conditions as Example 8 except offset of the ultrasonic sensors is noted in Table 5. The expected inspection results are included in Table 5.

TABLE 5

| Samples | Type of cracks | Scan # | Horizontal offset (mm) | Vertical offset (mm) | Expected Detection |
|---|---|---|---|---|---|
| S10 | Horizontal and vertical cracks | 1 | 35 | 0 | Only vertical cracks detected |
| | | 2 | 50 | 10 | Only vertical cracks detected |
| | | 3 | 35 | 35 | Both horizontal and vertical cracks detected |
| | | 4 | 35 | 33 | Both horizontal and vertical cracks detected |
| S11 | Horizontal and vertical cracks | 1 | 50 | 0 | Only vertical cracks detected |
| | | 2 | 35 | 30 | Both horizontal and vertical cracks detected |

The present application represents a departure from the state of the art. Notably, the embodiments herein relate to processes and systems that demonstrate unexpected improvement in inspecting an object. In particular, the process and system can allow identification of anomalies that may not be identified by a conventional ultrasonic non-destructing process, particularly in relatively large ceramic objects, and significantly reduce false positive error rates. More particularly, detection of anomalies can be facilitated by offsetting the ultrasonic transducers in one or more directions, positioning the transducers to have particular offset, applying one or more or a cascade of thresholds to acquired images, analysis of features of anomalies, or any combination thereof. Not wishing to be bound to any theory, it is noted offsetting transducers in a first direction, e.g., a longitudinal axis, of the object may facilitate improved detection of anomalies that extend in a direction orthogonal to the first direction. Offsetting the transducers in at least two directions that are orthogonal, e.g., the longitudinal axis and a direction that is perpendicular to the longitudinal direction, may facilitate overall improvement in detection of anomalies.

Note that not all of the activities described above in the general description or the examples are required, that a portion of a specific activity may not be required, and that one or more further activities may be performed in addition to those described. Still further, the orders in which activities are listed are not necessarily the order in which they are performed. Any values of properties or characteristics of the embodiments herein can represent average or median values derived from a statistically relevant sample size. Unless otherwise stated, it will be appreciated that compositions are based on a total of 100%, and the total content of the components does not exceed 100%.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention.

As used herein, the terms "comprises", "comprising", "includes", "including", "has", "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A process of inspecting a ceramic body, comprising:
positioning a first and second ultrasonic element relative to the ceramic body, wherein the first and second ultrasonic elements are positioned across the ceramic body and offset in a direction orthogonal to a longitudinal axis of the ceramic body, wherein the ceramic body is solid;
introducing ultrasonic signals into the ceramic body via one of the first and second ultrasonic elements;
moving at least one of the first and second ultrasonic elements along at least a portion of the body, wherein the first and second ultrasonic elements are offset by at least 30% of a dimension of the first or second ultrasonic element in the direction orthogonal to the longitudinal axis of the ceramic body; and creating a map of the ceramic body based on ultrasonic signals received by another one of the first and second ultrasonic elements, wherein the map comprises at least one region including attenuated pixels.

2. The process of claim 1, wherein the ceramic body comprises a refractory material.

3. The process of claim 1, wherein the ceramic body comprises a length L, a thickness T, and a width W, wherein $L \geq W \geq T$.

4. The process of claim 1, wherein the ceramic body comprises grains of a ceramic material, wherein the grains have a grain size of at least 0.5 microns and at most 5 mm.

5. The process of claim 1, wherein the ceramic body comprises a density of at least 90% of a theoretical density.

6. The process of claim 1, comprising applying a predetermined threshold to the map of the ceramic body and identifying at least one anomaly in the map of the ceramic body.

7. The process of claim 1, wherein the first and second ultrasonic elements comprise air-coupled ultrasonic sensors.

8. The process of claim 1, comprising offsetting the first and second ultrasonic elements in the longitudinal axis of the ceramic body.

9. The process of claim 1, comprising offsetting the first and second ultrasonic elements by greater than 70% of the dimension of the first or second ultrasonic element in the direction orthogonal to the longitudinal axis of the ceramic body, wherein the dimension comprises an outer diameter, a width, a length, perimeter, or a thickness.

10. The process of claim 1, comprising:
positioning the first and second ultrasonic elements at opposite sides separated in the longitudinal axis of the ceramic body and offsetting the first and second ultrasonic elements in a width direction and in a thickness direction of the ceramic body, wherein one of the width direction or the thickness direction is orthogonal to the longitudinal axis;
positioning the first and second ultrasonic elements at opposite sides separated in the width direction of the ceramic body and offsetting the first and second ultrasonic elements in the longitudinal axis and the thickness direction of the ceramic body; or
positioning the first and second ultrasonic elements at opposite sides separated in the thickness direction of the ceramic body and offsetting the first and second ultrasonic elements in the longitudinal axis and the width direction of the ceramic body.

11. The process of claim 1, wherein the first and second ultrasonic elements are offset in the longitudinal axis of the ceramic body by at least 30 mm.

12. The process of claim 11, wherein the first and second transducer are offset in the direction orthogonal to the longitudinal axis of the ceramic body by greater than 28 mm.

13. The process of claim 1, further comprising:
creating a map of the ceramic body based on received ultrasonic signals;
identifying a first anomaly in the map;
analyzing the first anomaly; and
categorizing the first anomaly into a first or second type of anomaly.

14. The process of claim 13, wherein analyzing the first anomaly comprises comparing one or more of a surface area, shape, and aspect ratio of width:length of the first anomaly to one or more predetermined values.

15. A process of inspecting a ceramic body, comprising:
scanning a longitudinal side surface and an opposite longitudinal side surface of the ceramic body, wherein scanning comprises:
moving a first ultrasonic element and a second ultrasonic element along a longitudinal axis of the ceramic body, wherein the first and second ultrasonic elements are offset in a direction orthogonal to the longitudinal axis of the ceramic body, the longitudinal axis, or both;
introducing ultrasonic signals into the ceramic body via one of the first and second ultrasonic elements; and
receiving the ultrasonic signals leaving the ceramic body via the other one of the first and second ultrasonic elements;
creating a map of the ceramic body including at least one anomaly based on the received ultrasonic signals, wherein the at least one anomaly includes an internal anomaly inside the ceramic body; and
providing a quality value associated with the ceramic body based on evaluation of one or more criteria selected from the group consisting of the type, number, size, shape, position, orientation, edge sharpness, and any combination thereof of the internal anomaly.

16. The process of claim 15, wherein the first and second ultrasonic elements are offset in the direction orthogonal to the longitudinal axis of the ceramic body and the longitudinal axis.

17. The process of claim 16, wherein the first and second ultrasonic elements are offset in the direction orthogonal to the longitudinal axis by a distance of at least 0.2% of a length of the body.

18. The process of claim 16, wherein an overlap of the first and second ultrasonic elements is not greater than 30% of a dimension of the first or second ultrasonic element in the direction orthogonal to the longitudinal axis of the ceramic body, the longitudinal axis, or both, wherein the dimension comprises an outer diameter, a width, a length, perimeter, or a thickness.

19. The process of claim 16, wherein the first and second ultrasonic elements does not overlap in the direction orthogonal to the longitudinal axis of the ceramic body or the longitudinal axis.

20. The process of claim 15, wherein the ceramic body comprises a metal oxide comprising chromium, zirconium, titanium, aluminum, silicon, iron, an alkaline earth metal element, or any combination thereof.

* * * * *